US012346545B2

(12) United States Patent
Ogasawara

(10) Patent No.: US 12,346,545 B2
(45) Date of Patent: Jul. 1, 2025

(54) IMAGE DISPLAY APPARATUS, CONTROL METHOD AND NON-TRANSITORY COMPUTER-READABLE STORAGE MEDIUM FOR GENERATING A VIRTUAL VIEWPOINT IMAGE

(71) Applicant: CANON KABUSHIKI KAISHA, Tokyo (JP)

(72) Inventor: Taku Ogasawara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 645 days.

(21) Appl. No.: 17/238,513

(22) Filed: Apr. 23, 2021

(65) Prior Publication Data
US 2021/0349620 A1 Nov. 11, 2021

(30) Foreign Application Priority Data

May 8, 2020 (JP) ................................. 2020-082818

(51) Int. Cl.
G06F 3/04847 (2022.01)
G06F 3/04845 (2022.01)
G06F 3/0488 (2022.01)

(52) U.S. Cl.
CPC ...... *G06F 3/04847* (2013.01); *G06F 3/04845* (2013.01); *G06F 3/0488* (2013.01); *G06F 2203/04806* (2013.01)

(58) Field of Classification Search
CPC ............ G06F 3/04847; G06F 3/04845; G06F 3/0488; G06F 3/04855; G06F 3/0485;
(Continued)

(56) References Cited

U.S. PATENT DOCUMENTS 6,816,174 B2 * 11/2004 Tiongson ............ G06F 3/04855
715/784
7,933,395 B1 * 4/2011 Bailly ..................... G06F 16/29
715/850
(Continued)

FOREIGN PATENT DOCUMENTS

CN 104602129 A 5/2015
CN 106358036 A 1/2017
(Continued)

OTHER PUBLICATIONS

Notice of Reasons for Refusal issued by the Japanese Patent Office on Dec. 8, 2023 in corresponding JP Patent Application No. 2020-082818, with English translation.
(Continued)

*Primary Examiner* — Nicholas Klicos
(74) *Attorney, Agent, or Firm* — Carter, DeLuca & Farrell LLP

(57) ABSTRACT

There is provided an image display apparatus. The image display apparatus accepts a user operation for determining a first parameter which designates at least one of an orientation of view from virtual viewpoint and a position of a target point in a virtual viewpoint image; obtains a second parameter that is set in advance and that designates at least one of an orientation of view from virtual viewpoint and a position of a target point in a virtual viewpoint image; and displays, on a display unit, the virtual viewpoint image generated based on at least one of the first parameter and the second parameter.

17 Claims, 11 Drawing Sheets

(58) Field of Classification Search
CPC .......... G06F 2203/04806; H04N 23/62; H04N 23/63; H04N 23/631; H04N 23/90; H04N 23/695; G08B 13/19641
See application file for complete search history.

(56) References Cited

U.S. PATENT DOCUMENTS

| | | | |
|---|---|---|---|
| 9,294,757 B1* | 3/2016 | Lewis | G06F 3/038 |
| 9,836,204 B1* | 12/2017 | Huang | G06F 3/04855 |
| 2002/0063737 A1* | 5/2002 | Feig | G06F 3/04847 |
| | | | 715/786 |
| 2005/0018045 A1* | 1/2005 | Thomas | G06V 10/147 |
| | | | 348/E5.022 |
| 2006/0028476 A1* | 2/2006 | Sobel | G06T 13/00 |
| | | | 345/474 |
| 2006/0132482 A1* | 6/2006 | Oh | G06T 3/0012 |
| | | | 345/419 |
| 2007/0238981 A1* | 10/2007 | Zhu | A61B 34/20 |
| | | | 600/424 |
| 2009/0282362 A1 | 11/2009 | Matsumoto | |
| 2009/0300475 A1* | 12/2009 | Fink | H04N 21/4781 |
| | | | 726/4 |
| 2011/0235996 A1 | 9/2011 | Ikeda | |
| 2013/0132375 A1* | 5/2013 | Jones | G06F 16/9538 |
| | | | 707/759 |
| 2013/0300937 A1* | 11/2013 | Williams | H04N 5/2628 |
| | | | 348/584 |
| 2013/0326425 A1* | 12/2013 | Forstall | G01C 21/3878 |
| | | | 715/851 |
| 2014/0270706 A1* | 9/2014 | Pasko | H04N 21/854 |
| | | | 386/278 |
| 2015/0074611 A1* | 3/2015 | Kontkanen | G06F 3/0485 |
| | | | 715/850 |
| 2016/0171335 A1* | 6/2016 | Aguilera Perez | H04N 13/221 |
| | | | 382/285 |
| 2016/0231826 A1 | 8/2016 | Kontkanen | |
| 2017/0061687 A1* | 3/2017 | Hong | G06F 3/04845 |
| 2018/0160049 A1 | 6/2018 | Aizawa | |
| 2018/0164434 A1* | 6/2018 | Stokes | G01S 7/6263 |
| 2018/0204381 A1* | 7/2018 | Kanatsu | G06T 7/248 |
| 2019/0083885 A1* | 3/2019 | Yee | G06T 15/20 |
| 2020/0112672 A1* | 4/2020 | Perazio | H04N 23/695 |
| 2021/0056662 A1 | 2/2021 | Ogasawara | |
| 2021/0235014 A1 | 7/2021 | Ogasawara | |

FOREIGN PATENT DOCUMENTS

| | | |
|---|---|---|
| CN | 106569611 A | 4/2017 |
| CN | 110225405 A | 9/2019 |
| JP | 2009-295147 A | 12/2009 |
| JP | 2011-043991 A | 3/2011 |
| JP | 2011-211338 A | 10/2011 |
| JP | 2014-119095 A | 6/2014 |
| JP | 2014-215828 A | 11/2014 |
| JP | 2018-092491 A | 6/2018 |
| JP | 2018-093312 A | 6/2018 |
| JP | 6419278 B | 11/2018 |
| JP | 2019-114847 A | 7/2019 |
| JP | 2020-024619 A | 2/2020 |
| JP | 2020-067716 A | 4/2020 |

OTHER PUBLICATIONS

Korean Office Action issued in corresponding KR Patent Application No. 10-2021-0056992, dated Sep. 13, 2024, with English translation.
Chinese Office Action issued by the China National Intellectual Property Administration on Dec. 26, 2024 in corresponding CN Patent Application No. 202110472533.X, with English translation.

* cited by examiner

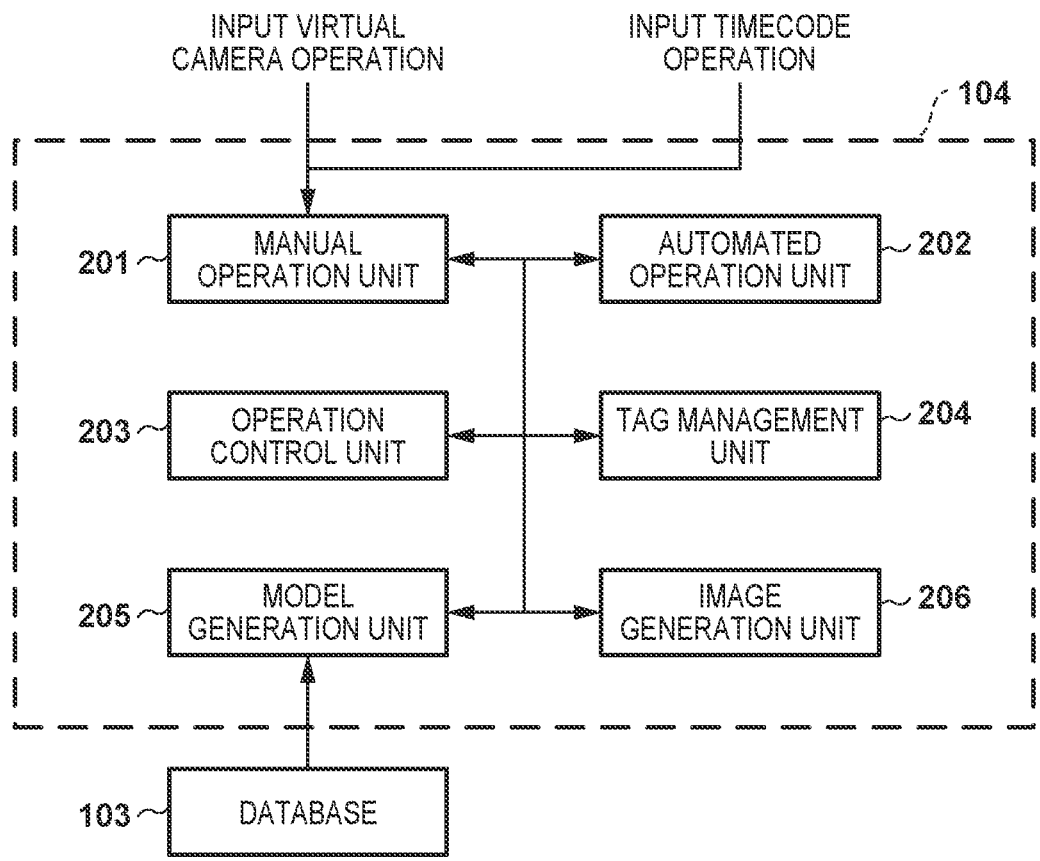
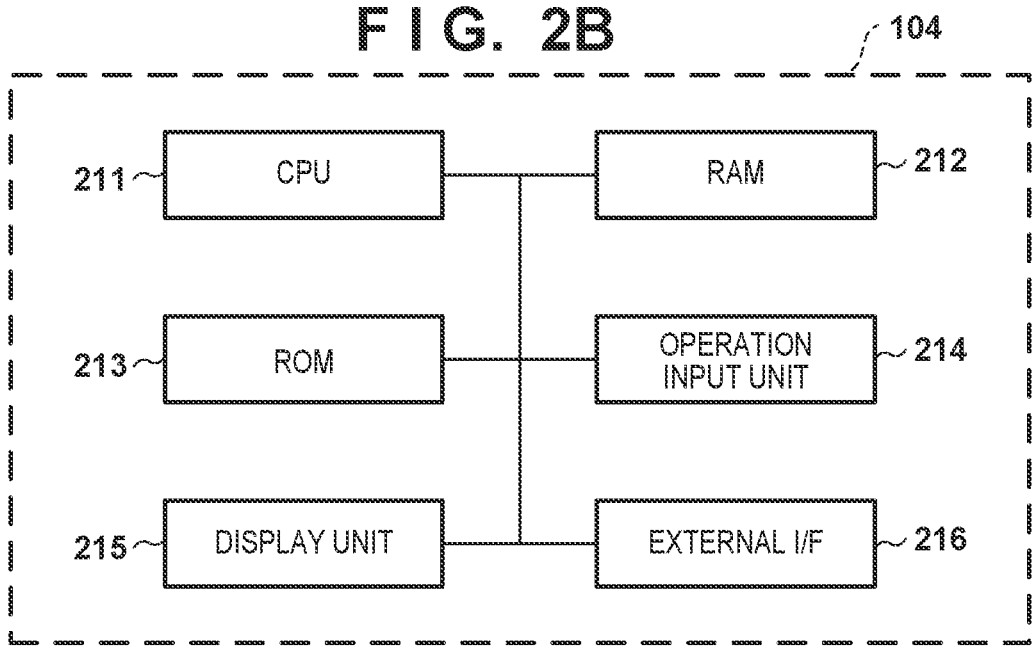

FIG. 4A

| MOTION ID | VIRTUAL CAMERA MOTION |
|---|---|
| 1 | ENLARGING OR SHRINKING |
| 2 | TRANSLATION OF TARGET POINT |
| 3 | HORIZONTAL ROTATION CENTERED AT TARGET POINT |
| 4 | VERTICAL ROTATION CENTERED AT TARGET POINT |
| ... | ... |

FIG. 4B

| ITEM | VIRTUAL CAMERA MOTION |
|---|---|
| AUTOMATED OPERATION | 2 |
| MANUAL OPERATION | 1, 2, 3, 4 |

| TIMECODE | TARGET POINT OF VIRTUAL CAMERA | ORIENTATION OF VIRTUAL CAMERA |
|---|---|---|
| 2020-02-02 13:51:11.020 | x01, y01, z01 | x101, y101, z101 |
| 2020-02-02 13:51:11.021 | x02, y02, z01 | |
| 2020-02-02 13:51:11.022 | x03, y03, z01 | |
| ... | ... | ... |
| 2020-02-02 13:51:11.057 | xa1, ya1, z01 | |
| 2020-02-02 13:51:11.058 | xa2, ya2, z01 | |
| 2020-02-02 13:51:11.059 | xa3, ya3, z01 | |

FIG. 4D
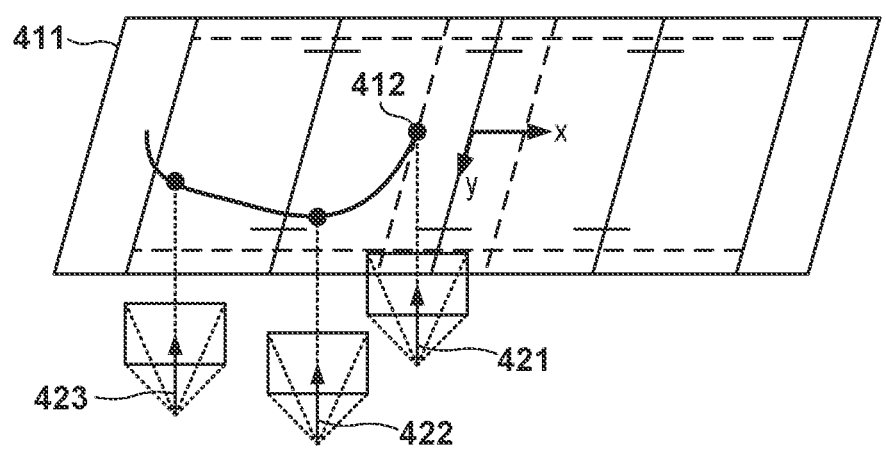
FIG. 4E  FIG. 4F  FIG. 4G
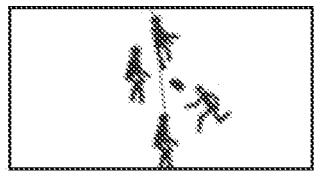 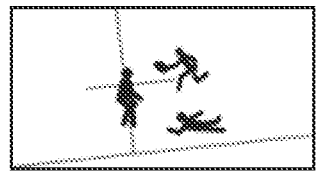 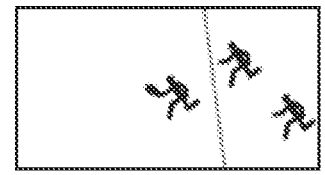

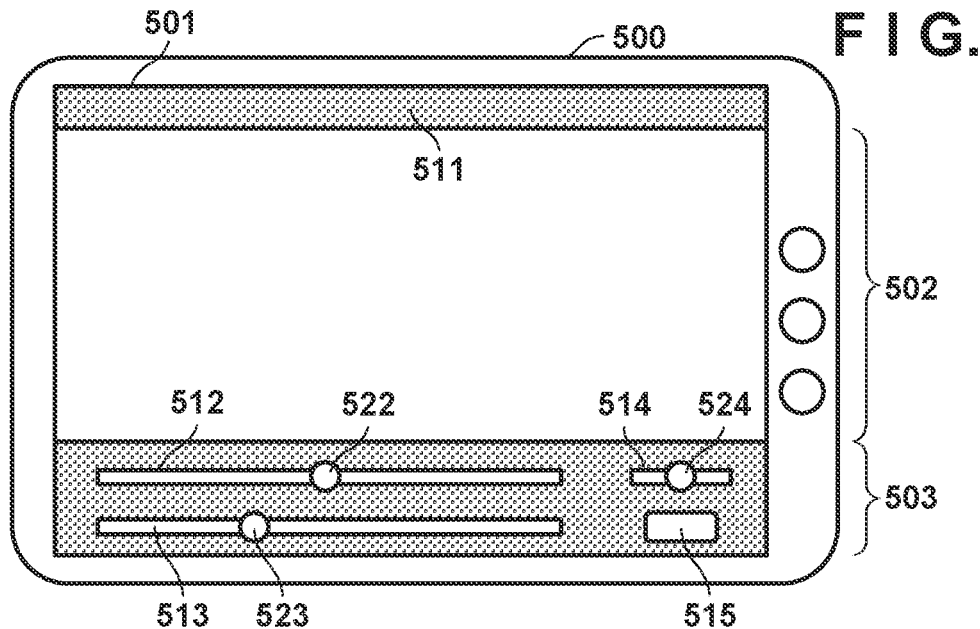

| No | TOUCH OPERATION | NUMBER OF TOUCHES | TOUCH REGION | VIRTUAL CAMERA MOTION IDENTIFIER |
|---|---|---|---|---|
| 1 | TAP | 1 | OPERATION REGION OF VIRTUAL CAMERA | 2 |
| 2 | SWIPE: HORIZONTAL DIRECTION | 1 | OPERATION REGION OF VIRTUAL CAMERA | 3 |
| 3 | SWIPE: VERTICAL DIRECTION | 1 | OPERATION REGION OF VIRTUAL CAMERA | 4 |
| 4 | DRAG: HORIZONTAL DIRECTION | 1 | OPERATION REGION OF VIRTUAL CAMERA | 3 |
| 5 | DRAG: VERTICAL DIRECTION | 1 | OPERATION REGION OF VIRTUAL CAMERA | 4 |
| 6 | DRAG | 2 | OPERATION REGION OF VIRTUAL CAMERA | 2 |
| ... | ... | ... | ... | ... |
| N | SWIPE: VERTICAL DIRECTION | 1 | OPERATION REGION OF VIRTUAL CAMERA: RIGHT EDGE | 1 |
| N+1 | DOUBLE TAP | 1 | OPERATION REGION OF VIRTUAL CAMERA | 8 |
| N+2 | DOUBLE TAP | 1 | OTHER REGIONS | 9 |

IMAGE DISPLAY APPARATUS, CONTROL METHOD AND NON-TRANSITORY COMPUTER-READABLE STORAGE MEDIUM FOR GENERATING A VIRTUAL VIEWPOINT IMAGE

BACKGROUND

Field

The present disclosure relates to an image display apparatus, a control method, and a non-transitory computer-readable storage medium according to a virtual viewpoint image.

Description of the Related Art

In recent years, a technique for generating a virtual viewpoint image in which, from a plurality of captured images that are captured by a plurality of cameras, an arbitrary viewpoint image is generated has been getting attention. A virtual camera is used as a concept for expediently describing a virtual viewpoint designated in order to generate a virtual viewpoint image. A virtual camera, unlike a physical camera, can have various behaviors such as a move/rotation/enlargement/reduction in a three-dimensional space without physical restriction. To appropriately control a virtual camera, multiple operation methods corresponding to each behavior can be considered.

In Japanese Patent No. 6419278, a method for, in a configuration in which a virtual viewpoint image is displayed on an image display apparatus that comprises a touch panel, controlling a motion of a virtual camera in accordance with the number of fingers in a touch operation performed on a touch panel is disclosed.

In the method disclosed in Japanese Patent No. 6419278, depending on the intended behavior of the virtual viewpoint, the operation is difficult in cases where it is desired to move the virtual viewpoint significantly and cases where it is desired to make complicated changes.

SUMMARY

An aspect of the present disclosure is to eliminate the above-mentioned problem with conventional technology.

The feature of the present disclosure is to provide a technique for improving convenience when browsing a virtual viewpoint image.

According to the present disclosure, there is provided an image display apparatus comprising: an acceptance unit configured to accept a user operation for determining a first parameter which designates at least one of an orientation of view from virtual viewpoint and a position of a target point in a virtual viewpoint image; an obtainment unit configured to obtain a second parameter that is set in advance and that designates at least one of an orientation of view from virtual viewpoint and a position of a target point in a virtual viewpoint image; and a display unit configured to display, on a display unit, the virtual viewpoint image generated based on at least one of the first parameter and the second parameter.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 2A is a view illustrating functions of an image display apparatus.

FIG. 2B is a view illustrating a configuration of the image display apparatus.

FIG. 4A is a view illustrating an operation example of the virtual camera by an automated operation.

FIG. 4B is a view illustrating a setting example of motion of the virtual camera.

FIG. 4C is a view illustrating an example of automated operation information.

FIG. 4D is a view illustrating an example of the automated operation information.

FIG. 4E is a view illustrating an example of a virtual viewpoint image.

FIG. 4F is a view illustrating an example of a virtual viewpoint image.

FIG. 4G is a view illustrating an example of a virtual viewpoint image.

FIG. 5A is a view illustrating a manual operation screen.

FIG. 5B is a view illustrating manual operation information.

DESCRIPTION OF THE EMBODIMENTS

Figure 1A:
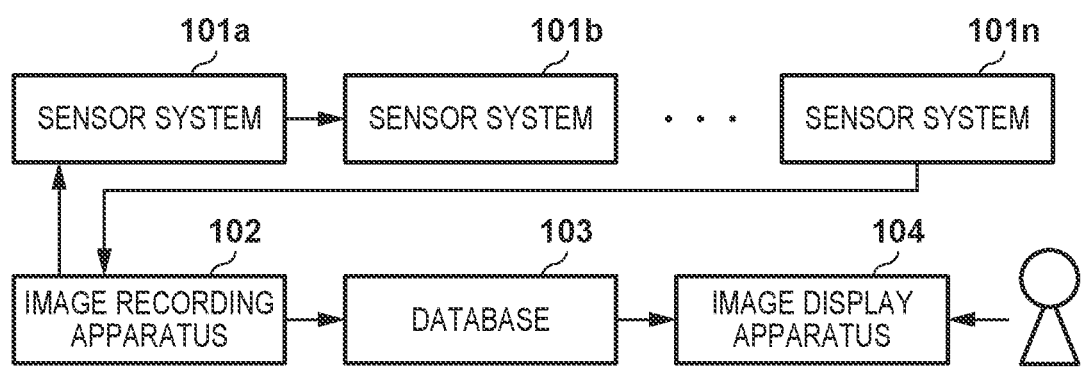
FIG. 1A is a configuration diagram of a virtual viewpoint image generation system.

Hereinafter, embodiments will be described in detail with reference to the attached drawings. Note, the following embodiments are not intended to limit the scope of the claimed disclosure. Multiple features are described in the embodiments, but limitation is not made to an disclosure that requires all such features, and multiple such features may be combined as appropriate.

Furthermore, in the attached drawings, the same reference numerals are given to the same or similar configurations, and redundant description thereof is omitted.

First Embodiment

In the present embodiment, a system for generating a virtual viewpoint image expressing a view from a designated virtual viewpoint based on a plurality of images captured by a plurality of image capturing apparatuses and the designated virtual viewpoint, will be described. The virtual viewpoint image in the present embodiment is not limited to an image corresponding to a viewpoint that the user freely (arbitrarily) designates, and the virtual viewpoint image may be an image corresponding to a viewpoint that the user selects from a plurality of candidates, for example. In the present embodiment, a case where the virtual viewpoint is designated via a user operation is mainly described, but the virtual viewpoint may be automatically designated based on a result of image analysis or the like.

In the present embodiment, the description will be given using the term "virtual camera". The virtual camera is a virtual camera that is different from the plurality of actual image capturing apparatuses installed around the image capturing area, and is a concept for expediently explaining a virtual viewpoint used in generation of a virtual viewpoint image. That is, the virtual viewpoint image can be regarded as an image captured from the virtual viewpoint set in the virtual space associated with the imaging region. The position and direction of the viewpoint in the virtual imaging can be represented as the position and direction of the virtual camera. In other words, the virtual viewpoint image can be said to be an image that simulates a captured image which would be obtained by a camera if the camera hypothetically were positioned at the virtual viewpoint set in the space.

As to the order of explanation, the entire virtual viewpoint image generation system will be described with reference to FIG. 1A and FIG. 1B, and an image display apparatus 104 will be described with reference to FIG. 2A and FIG. 2B. The image display apparatus 104 will perform virtual camera control processing that significantly combines automated operation and manual operation. Using FIG. 6, a process for controlling the virtual camera will be described, and an example of control thereof, and an example of displaying a virtual viewpoint image using that virtual camera will be described in FIG. 7A to FIG. 7E.

In FIG. 3A to FIG. 3H, FIG. 4A to FIG. 4G, and FIG. 5A, and FIG. 5B, a configuration of a virtual camera needed for explanation of these, and automatic processing and manual processing will be described respectively.

(Configuration of the Virtual Viewpoint Image Generation System)

First, a configuration of a virtual viewpoint image generation system 100 according to the present embodiment will be described with reference to FIGS. 1A and 1B.

The virtual viewpoint image generation system 100 includes n sensor systems from a sensor system 101a to a sensor system 101n, and each sensor system includes at least one camera which is an image capturing apparatus. Hereinafter, unless otherwise specified, "sensor system 101" will represent a plurality of sensor systems 101, without distinguishing between the n sensor systems.

Figure 1B:
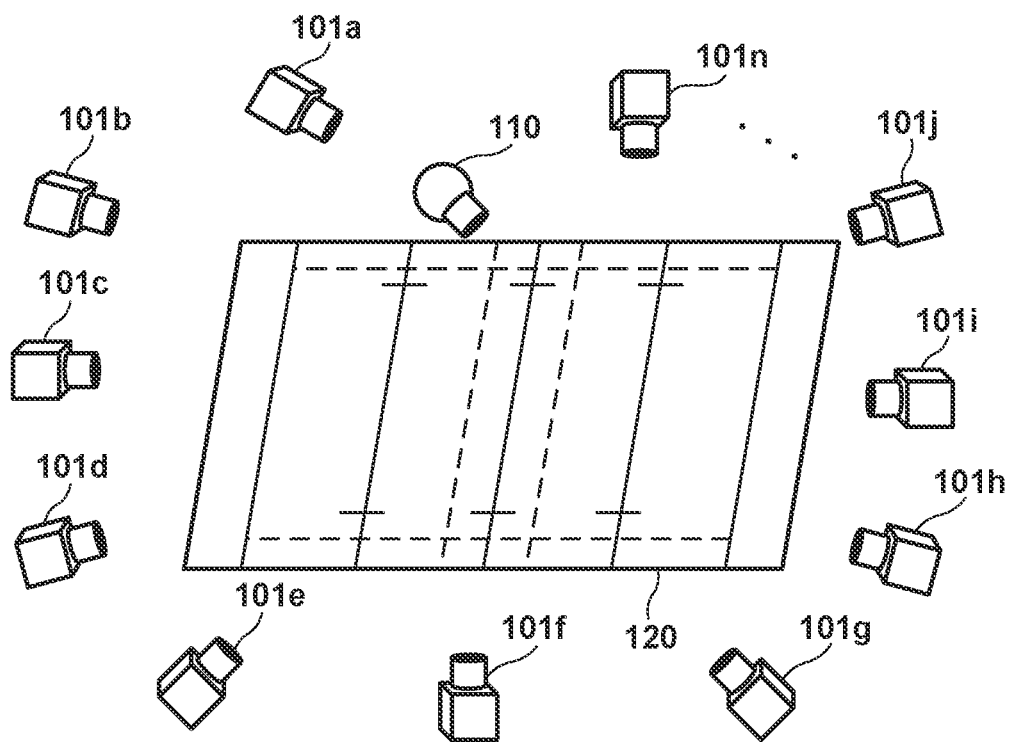
FIG. 1B is a view illustrating an example of an installation of a plurality of sensor systems 101.

FIG. 1B is a view illustrating an example of installation of a plurality of sensor systems 101. The plurality of sensor systems 101 are installed to surround a region 120 which is a target region of capturing, and the sensor systems 101 capture the region 120 from different directions respectively. In the example of the present embodiment, the region 120 which is the image capturing target is assumed to be a field of a stadium where a soccer game is to be played, and n (for example, 100) sensor systems 101 will be described as installed so as to surround the field. However, the number of sensor systems 101 to be installed is not limited, and the capturing target region 120 is not limited to a stadium field. For example, grandstands of the stadium may be included in the region 120, and the region 120 may be an indoor studio or a stage or the like.

Also, configuration may be taken so that the plurality of sensor systems 101 are not installed over the entire circumference of the region 120, and configuration may be taken so that the plurality of sensor systems 101 are installed only in a part of the periphery of the region 120 depending on a restriction on the installation location or the like. Also, in a plurality of cameras included in the plurality of sensor systems 101, image capturing apparatuses having different functions such as a telephoto camera and a wide-angle camera may be included.

A plurality of cameras included in the plurality of sensor systems 101 perform capturing in synchronism with one another. A plurality of images obtained by capturing by these cameras is referred to as a multi-viewpoint image. Note that, each of the multi-viewpoint images in the present embodiment may be a captured image, and may be an image obtained by performing image processing, for example processing for extracting the predetermined region, with respect to the captured image.

Note that, the plurality of sensor systems 101 may include a microphone (not shown) in addition to a camera. Each microphone of the plurality of sensor systems 101 collects audio in synchronism with one another. It is possible to generate an audio signal reproduced together with the image display in the image display apparatus 104 based on the collected audio. Hereinafter, for descriptive simplicity, description of the audio is omitted, but it is basically assumed that the image and audio are processed at the same time.

An image recording apparatus 102 obtains the multi-viewpoint image from the plurality of sensor systems 101, and stores it with a timecode used for capturing in a database 103. The timecode is information for uniquely identifying the time at which the image capturing apparatus captured an image, and it is possible to designate the timecode in a form of "day:time:minute:second.frame number", for example.

The image display apparatus 104 provides images based on the multi-viewpoint image in accordance with the timecode from the database 103 and the manual operation of the user with respect to the virtual camera.

A virtual camera 110 is set within a virtual space associated with the region 120 and can view the region 120 from a viewpoint different from any camera of the plurality sensor systems 101. The virtual camera 110 and details of its motion are described below with reference to FIG. 3C to FIG. 3H.

In the present embodiment, both automated operation and manual operation with respect to the virtual camera 110 are used, but automated operation information for the automated operation of the virtual camera is described below in FIG.

4A. Also, a manual operation method for the manual operation of the virtual camera 110 is described below in FIG. 5A and FIG. 5B.

The image display apparatus 104 executes virtual camera control processing that significantly combines automated operation and manual operation, and generates the virtual viewpoint image from the multi-viewpoint image based on the controlled virtual camera and timecode. This virtual camera control processing will be described in detail in FIG. 6, and a control example thereof and an example of a virtual viewpoint image generated using the virtual camera are in FIG. 7A to FIG. 7E.

The virtual viewpoint image which the image display apparatus 104 generates is an image representing a view from the virtual camera 110. The virtual viewpoint image in the present embodiment is also referred to as a free viewpoint video and is displayed on a touch panel of a liquid crystal display or the like of the image display apparatus 104.

Note that, the configuration of the virtual viewpoint image generation system 100 is not limited to the one which FIG. 1A illustrates. Configuration may be such that the image display apparatus 104 is separate from the operation device or the display device. Also, configuration may be such that a plurality of display devices are connected to the image display apparatus 104 and virtual viewpoint images are output respectively.

Note that, in the example of FIG. 1A, it was explained that the database 103 and the image display apparatus 104 are different apparatuses, but configuration may be such that the database 103 and the image display apparatus 104 are of an integrated type. Also, configuration may be such that an important scene from the database 103 is copied to the image display apparatus 104 in advance. Furthermore, configuration may be taken to switch, in accordance with a setting of a timecode for which access is possible by the database 103 and the image display apparatus 104, whether to enable access to all timecodes in a game or to enable access to only some. By a configuration that copies some data, configuration may be taken to permit access to only timecodes of the copied section.

Note that, in the present embodiment, though an explanation is focused on an example in which the virtual viewpoint image is a moving image, the virtual viewpoint image may be a still image.

(Functional Configuration of the Image Display Apparatus)

Next, a configuration of the image display apparatus 104 will be explained with reference to FIG. 2A and FIG. 2B.

FIG. 2A is a view illustrating a functional configuration example of the image display apparatus 104. The image display apparatus 104 uses functions illustrated in FIG. 2A and executes virtual camera control processing that significantly combines an automated operation and a manual operation. The image display apparatus 104 comprises a manual operation unit 201, an automated operation unit 202, an operation control unit 203, a tag management unit 204, a model generation unit 205, and an image generation unit 206.

The manual operation unit 201 is an acceptance unit for accepting input information which a user manually entered with respect to the virtual camera 110 of the timecode. Although the manual operation of the virtual camera includes operations of at least one of a touch panel, a joystick, or a keyboard, the manual operation unit 201 may obtain input information via an operation of other input devices. Details of a manual operation screen are described below in FIG. 5A and FIG. 5B.

The automated operation unit 202 automatically operates the virtual camera 110 and the timecode. An example of an automated operation in the present embodiment is described in detail with reference to FIG. 4A, and in addition to a manual operation by the user, the image display apparatus 104 operates or sets a virtual camera or a timecode. To the user, unlike operation the user performed themself, the experience is as though the virtual viewpoint image was automatically operated. Information which the automated operation unit 202 uses for an automated operation is called automated operation information, and for example, three-dimensional model coordinates and position information measured by GPS or the like related to later-described players and the ball are used. Note that, the automated operation information is not limited to these, and is only required to be designatable information which relates to the virtual camera and the timecode without depending on a user operation.

The operation control unit 203 significantly combines user input information that the manual operation unit 201 obtained from the manual operation screen and automated operation information that the automated operation unit 202 uses and controls the virtual camera or the timecode.

Details of processing of the operation control unit 203 are described below with reference to FIG. 6, and the example of the virtual viewpoint image generated by the controlled virtual camera is described below with reference to FIG. 7A to FIG. 7E.

Also, in the operation control unit 203, the virtual camera motion which is an operation target of each of the automated operation and the manual operation is set, and this is called motion setting processing, and details thereof are described below with reference to FIG. 4A and FIG. 4B.

The model generation unit 205 generates the three-dimensional model representing three-dimensional topologies of the object within the region 120 based on the multi-viewpoint image obtained by designating the timecode from the database 103. Specifically, from the multi-viewpoint image, a foreground image in which a foreground region corresponding to objects such as a ball and a person is extracted, and a background image in which a background region other than the foreground region is extracted are obtained. Then, the model generation unit 205 generates a foreground three-dimensional model based on a plurality of foreground images.

The three-dimensional model is generated by a topology estimating method such as a visual volume intersection method (Visual Hull) or the like, and is configured from a point group. However, the form of the three-dimensional shape data representing the topology of the objects is not limited to this. Note that, a background three-dimensional model may be obtained by an external apparatus in advance. Note that, configuration may be such that the model generation unit 205 is not included in the image display apparatus 104 but rather in the image recording apparatus 102. In this case, the three-dimensional model is recorded to the database 103, and the image display apparatus 104 reads out the three-dimensional model from the database 103. Note that configuration may be taken so that, in relation to the foreground three-dimensional model, coordinates of each of the ball, the people, and objects are calculated and accumulated in the database 103. The coordinates of each object may be designated as automated operation information to be described later with reference to FIG. 4C, and used for an automated operation.

The image generation unit 206 generates the virtual viewpoint image from the three-dimensional model based on the control-processed virtual camera. Specifically, for each point configuring the three-dimensional model, an appropriate pixel value is obtained from the multi-viewpoint image and a coloring process is performed. Also, by arranging a colored three-dimensional model in a three-dimensional virtual space and projecting to the virtual viewpoint and rendering, the virtual viewpoint image is generated. However, the method of generating the virtual viewpoint image is not limited to this, and various methods such as a method for generating the virtual viewpoint image by the projective transformation of the captured image without using a three-dimensional model can be used. Note that the model generation unit 205 and image generation unit 206 may be configured as a device different from the image display apparatus 104 and connected to the image display apparatus 104.

The tag management unit 204 manages, as tags, automated operation information which the automated operation unit 202 uses. The tags will be described later in a second embodiment, and the present embodiment will be described as a configuration in which tags are not used.

(Hardware Configuration of the Image Display Apparatus)

Next, a hardware configuration of the image display apparatus 104 is explained with reference to FIG. 2B. The image display apparatus 104 includes a CPU (Central Processing Unit) 211, a RAM (Random Access Memory) 212, and a ROM (Read Only Memory) 213. Also, the image display apparatus 104 includes an operation input unit 214, a display unit 215, and an external interface 216.

The CPU 211 processes using program and data stored in the RAM 212 and the ROM 213. The CPU 211 performs overall motion control of the image display apparatus 104, and executes processing for realizing each function illustrated in FIG. 2A. Note that, the image display apparatus 104 may include one or more dedicated piece of hardware different from the CPU 211, and the dedicated hardware may execute at least a part of the processing by the CPU 211. Examples of dedicated hardware include an Application Specific Integrated Circuit (ASIC), a Field Programmable Gate Array (FPGA), and a Digital Signal Processor (DSP).

The ROM 213 holds programs and data. The RAM 212 includes a work area for temporarily storing programs and data read out from the ROM 213. Also, the RAM 212 provides a work area to be used when the CPU 211 executes each process.

The operation input unit 214 is a touch panel, for example, and obtains information which a user operates. For example, operations with respect to the virtual camera and the timecode are accepted. Note that, the operation input unit 214 may be connected with the external controller and accept the input information from a user related to the operation. The external controller is a three-axis controller such as a joystick or a mouse or the like, for example. Note that, the external controller is not limited to these.

The display unit 215 is a touch panel or a screen and displays a generated virtual viewpoint image. In a case of a touch panel, configuration is such that the operation input unit 214 and the display unit 215 are a single body.

The external interface 216 performs transmitting and receiving of information with respect to the database 103 via a LAN or the like, for example. Also, via an image output port such as HDMI (registered trademark) or SDI, information may be transmitted to an external screen. Also, via Ethernet or the like, the image data may be transmitted.

(Virtual Camera Motion)

Next, with reference to FIG. 3A to FIG. 3H, motion of the virtual camera 110 (or the virtual viewpoint) will be described. For the sake of descriptive convenience of this motion, a virtual camera position and orientation/view frustum/target point or the like will be described first.

Figure 3A:
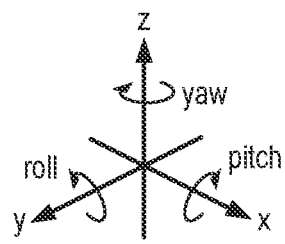
FIG. 3A is a view illustrating a coordinate system of a virtual camera.

The virtual camera 110 and the motion thereof is designated using one coordinate system. For the coordinate system, an ordinary three-dimensional space orthogonal coordinate system configured from an X-axis/a Y-axis/a Z-axis illustrated in FIG. 3A is used.

Figure 3B:
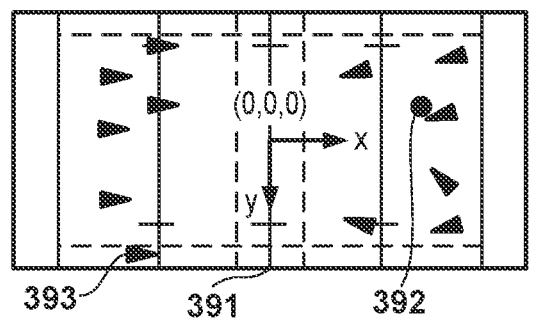
FIG. 3B is a view illustrating a position of the virtual camera.

The coordinate system is set and used for the subject. The subject is a field of a stadium, a studio, or the like. The subject, as illustrated in FIG. 3B, includes the entire field 391 of a stadium and a ball 392 and a player 393 thereon, and the like. Note that the subject may include grandstands or the like in the periphery of the field.

In setting for a subject of the coordinate system, the center of the field 391 is made to be the origin point (0, 0, 0). Also, the X-axis is made to be the long-side direction of the field 391, the Y-axis is made to be the short-side direction of the field 391, and the Z-axis is made to be the vertical direction with respect to the field. Here, the method of setting the coordinate system is not limited thereto.

Figure 3C:
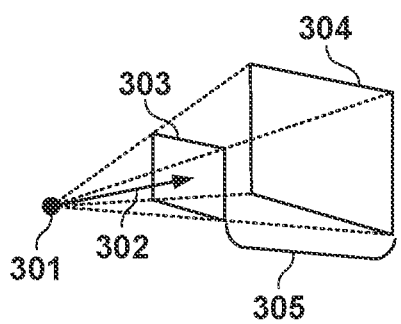
FIG. 3C is a view illustrating an orientation of the virtual camera.
Figure 3D:
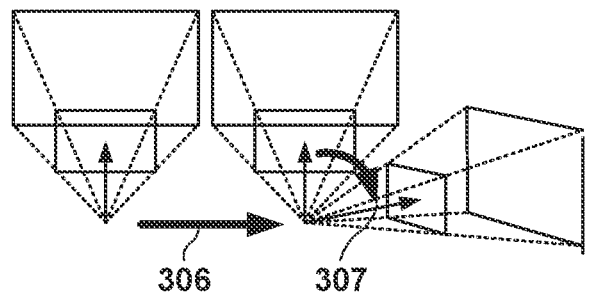
FIG. 3D is a view illustrating a movement of the virtual camera.

Next, using FIG. 3C and FIG. 3D, the virtual camera will be described. The virtual camera is a viewpoint for rendering the virtual viewpoint image. In the four-sided pyramid illustrated in FIG. 3C, the vector that extends from the vertex expresses the orientation 302 of the virtual camera for the position 301 of the virtual camera. The position of the virtual camera is expressed by the coordinates (x, y, z) of the three-dimensional space and the orientation is expressed by a unit vector that makes a scalar of the component of each axis.

The orientation 302 of the virtual camera is assumed to pass through the center coordinates of a front clip surface 303 and a rear clip surface 304. Also, a space 305 sandwiched between the front clip surface 303 and the rear clip surface is called the view frustum of the virtual camera, and is the range in which the image generation unit 206 generates the virtual viewpoint image (or the range in which the virtual viewpoint image is projected and displayed, hereinafter the display region of the virtual viewpoint image). The orientation 302 of the virtual camera is expressed as a vector, and referred to as the optical axis vector of the virtual camera.

Using FIG. 3D, movement and rotation of the virtual camera will be described. The virtual camera moves and rotates within a space expressed in the three-dimensional coordinates. A movement 306 of the virtual camera is a movement of the position 301 of the virtual camera, and is expressed by the component (x, y, z) of each axis. A rotation 307 of the virtual camera, as illustrated in FIG. 3A, is expressed by yaw which is a rotation around the Z-axis, pitch which is a rotation around the X-axis, and roll which is a rotation around the Y-axis.

By this, the virtual camera can freely move and rotate a three-dimensional space of the subject (field) and can generate an arbitrary region of the subject as a virtual viewpoint image. In other words, by designating the coordinates X, Y, and Z of the virtual camera and the rotation angles (pitch, roll, yaw) of the X-axis, the Y-axis, and the Z-axis, it is possible to operate the image capturing position and the image capturing direction of the virtual camera.

Figure 3E:
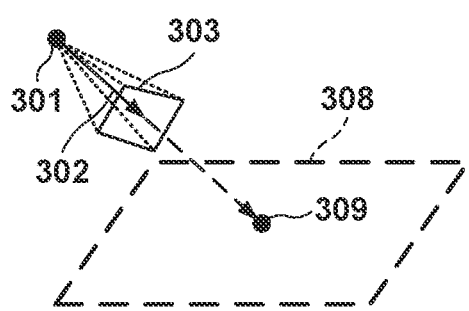
FIG. 3E is a view illustrating a movement of the virtual camera.

Next, a target point position of the virtual camera is described with reference to FIG. 3E. FIG. 3E illustrates a state in which the orientation 302 of the virtual camera is facing a target surface 308.

The target surface 308 is an XY plane (field surface, Z=0) described in FIG. 3B, for example. The target surface 308 is not limited to this and may be a plane that is parallel to the XY plane and at a height of a player that is natural for a human viewpoint (for example, Z=1.7 m) or the like. Note, the target surface 308 need not be parallel to the XY plane.

The target point position (coordinates) of the virtual camera indicates the orientation 302 (vector), the target surface 308, and an intersection point 309 of the virtual camera. Coordinates 309 of the target point of the virtual camera can be calculated as unique coordinates if the position 301, the orientation 302, and the target surface 308 of the virtual camera are determined. Note, calculation of the intersection point of the vector and the plane (the target point 309 of the virtual camera) used at this time is omitted because it can be realized by a known method. Note, a virtual viewpoint image may be generated such that the coordinates 309 of the target point of the virtual camera are at the center of the rendered virtual viewpoint image.

Here, movement of the virtual camera which can be realized by the combination of movement and rotation of the virtual camera is called a virtual camera motion in the present embodiment. Infinite virtual camera movements can be realized by combinations of movements and rotations, as described above, and among them, combinations that the user can easily see and operate may be defined in advance as virtual camera motions. According to the present embodiment, there are a plurality of representative virtual camera motions and these are an enlargement (zoom-in), a shrinking (zoom-out), a translation of the target point, and horizontal rotation or vertical rotation, or the like, centered around a target point unlike the foregoing rotation. These motions are described next.

Enlargement/shrinking are motions that enlarge or shrink the display of a subject in a display region of the virtual camera. An enlargement/shrinking of the subject is realized by the position 301 of the virtual camera moving forward-and-backward along an orientation direction 302 (optical axis direction) of the virtual camera. When the virtual camera advances along the orientation direction (optical axis direction) 302, the subject becomes enlarged as a result of approaching the subject in the display region without changing direction. Conversely, when the virtual camera retreats along the orientation direction (optical axis direction), the subject becomes smaller. Note, the enlargement/shrinking is not limited to this method and may use a change of the focal length of the virtual camera and the like.

A translation of the target point, is a motion in which the target point 309 of the virtual camera moves without changing the orientation 302 of the virtual camera. To describe this motion with reference to FIG. 3F, the translation of the target point 309 of the virtual camera is a locus 320 and indicates a movement from the target point 309 to a target point 319 of the virtual camera. Since, in the translation 320 of the target point, the position of the virtual camera changes but the orientation vector 302 does not change, the virtual camera motion is such that only the target point moves, and the subject continues to be visible from the same direction. Note, because the orientation vector 302 does not change, the translation 320 of the target point 309 of the virtual camera and a translation 321 of the position 301 of the virtual camera are the same movement loci (movement distance).

Figure 3F:
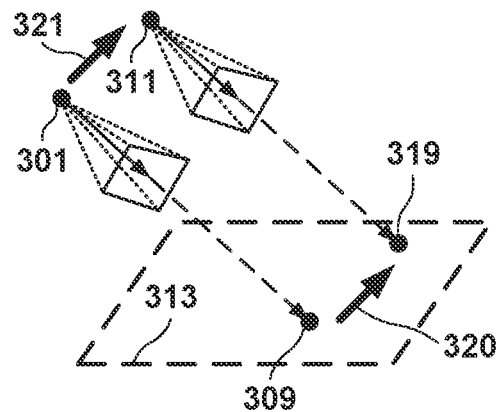
FIG. 3F is a view illustrating a movement of the virtual camera.
Figure 3G:
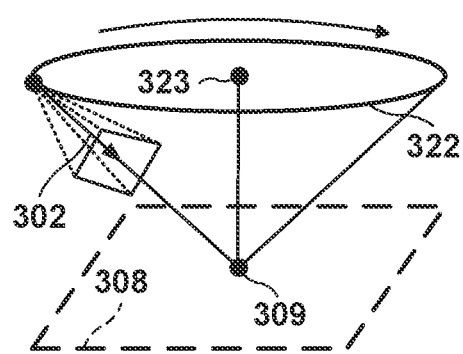
FIG. 3G is a view illustrating a movement of the virtual camera.

Continuing, description regarding a horizontal rotation of the virtual camera centered around a target point is given with reference to FIG. 3G. A horizontal rotation centered around a target point is, as illustrated in FIG. 3G, a motion in which the virtual camera the rotates 322 along a surface parallel to the target surface 308, centered around the target point 309. In the horizontal rotation centered around the target point 309, the orientation vector 302 changes while continuously facing the target point 309 and the coordinates of the target point 309 do not change. Since the target point 309 does not move, it is possible for the user to view a subject in the periphery from various angles without changing the height from the target surface by horizontal rotation centered around the target point. Since this motion does not shift the target point and the distance from the subject (target surface) does not change in height, the user can easily see a target of interest from various angles.

Note, the locus 322 at a time of rotation of the position 301 of the virtual camera is on a surface parallel to the target surface 308, and the center of rotation is reference numeral 323. In other words, the position of the virtual camera is determined so as to move on a circle with a radius R such that $R^2=(X1-X2)^2+(Y1-Y2)^2$ where the XY coordinates of the target point are (X1, Y1), and the XY coordinates of the virtual camera are (X2, Y2). Also, by determining the orientation so as to be an orientation vector from the position of the virtual camera in the XY coordinate direction of the target point, the subject can be viewed from various angles without shifting the target point.

Figure 3H:
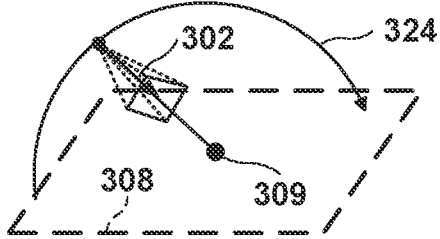
FIG. 3H is a view illustrating a movement of the virtual camera.

Continuing, description regarding a vertical rotation of the virtual camera centered around a target point is given with reference to FIG. 3H. The vertical rotation centered around the target point is, as illustrated in FIG. 3H, a motion in which the virtual camera rotates 324 along a vertical plane with respect to the target surface 308, centered around the target point 309. In the vertical rotation centered around the target point, the orientation vector 302 changes while continuing to face the target point 309 and the coordinates of the target point 309 do not change. The height from the target surface of the virtual camera is a motion which changes, unlike the horizontal rotation 322 described above. In such a case, the position of the virtual camera can be determined so that, on a plane perpendicular to the XY plane including the position of the virtual camera and the target point, the distance between the position of the virtual camera and the target point does not change. Also, by determining the orientation such that orientation vector is the position of the virtual camera to the position of the target point, it is possible to view the subject from various angles without shifting the target point.

By combining the vertical rotation 324 and the horizontal rotation 322 centered around the target point described above, the virtual camera can realize a motion in which it is possible to view the subject from various angles in 360 degrees without changing the target point 309. An example of operation control of the virtual camera which uses this motion is described later with reference to FIG. 7A to FIG. 7E.

Note, the virtual camera motions are not limited to these, and may be motions that can be realized by a combination of movement and rotation of the virtual camera. It is possible to enable operation of the virtual camera motions described above in the same manner whether it is an automated operation or a manual operation.

(Motion Setting Processing)

In the present embodiment, the virtual camera motions described in FIG. 3A to FIG. 3H can each be freely assigned to an automated operation and a manual operation. This assignment is called motion setting processing.

Next, with reference to FIG. 4A and FIG. 4B, the motion setting processing will be described. Note, the motion setting processing is executed in the operation control unit 203 of the image display apparatus 104.

FIG. 4A is a list in which identifiers are assigned to the virtual camera motions and is used in the motion setting processing. In FIG. 4A, the virtual camera motions described in FIG. 3C to FIG. 3H are set to a respective motion identifier (ID). For example, the translation of the target point described with reference to FIG. 3F is set to the identifier=2, the horizontal rotation centered around the target point described with reference to FIG. 3G is set to the identifier=3, and the vertical rotation centered around the target point described with reference to FIG. 3H is set to the identifier=4. Other identifiers can be set in the same way. The operation control unit 203 designates the virtual camera motion assigned to an automated operation or a manual operation by using this identifier. Note, in one example, a plurality of motion identifiers may be assigned to the same motion. For example, for the translation of the target point described with reference to FIG. 3F, a translation having a movement distance of 10 m may be set to identifier=5, and for the translation of the target point described with reference to FIG. 3F, a translation having a movement distance of 20 m may be set to identifier=6.

FIG. 4B is one example in which motions are set. In FIG. 4B, the translation (identifier=2) of the target point of the virtual camera is set as a target of an automated operation. Also, the enlargement/shrinking (identifier=1), the translation (identifier=2) of the target point, and the horizontal rotation (identifier=3) and vertical rotation (identifier=4) centered around the target point are set as targets of a manual operation.

The operation control unit 203 of the image display apparatus 104 controls the virtual camera motion by an automated operation and a manual operation in accordance with this motion setting. In the example of FIG. 4B, the target point of the virtual camera is translated by an automated operation in accordance with a timecode, and without changing the position of the target point designated by the automated operation, and the subject can be viewed at various angles or an enlargement factors by a manual operation of the user. A detailed description relating to the virtual camera motion according to this motion setting example and a display example of the virtual viewpoint image is described later with reference to FIG. 4C, FIG. 4D and FIG. 7A to FIG. 7E. Note, the combinations in which motion setting is possible are not limited to the example of FIG. 4B and the content of the motion setting can be changed midway. Also, configuration may be possible to set each of a plurality of virtual camera motions rather than just one for a motion which can be set in an automated operation or a manual operation.

The combination of motion settings may basically be exclusive control between automated operation and manual operation. For example, in the example of FIG. 4B, the target of the automated operation is the translation of the target point of the virtual camera, and during the automated operation, processing such as cancelling (ignoring) may be performed even in a case where the translation of the target point by a manual operation is operated. Also, processing such as temporarily deactivating exclusive control may be performed.

Also, for a combination in which motions are set, the image display apparatus 104 may hold a setting candidate in advance and the user may accept and set the virtual camera motion selection operation to be assigned to the automated operation and the manual operation by the user.

(Automated Operation Information)

In relation to the virtual camera motion designated as an automated operation in the motion setting processing described with reference to FIG. 4A and FIG. 4B, information indicating specific contents for each timecode is called automated operation information. Here, description regarding the automated operation information is given with reference to FIG. 4C and FIG. 4D. An identifier (type) of the virtual camera motion designated by the automated operation information is determined by the motion setting processing as described with reference to FIG. 4A and FIG. 4B. FIG. 4C is an example of the automated operation information corresponding to the example of motion setting of FIG. 4B.

For the automated operation information 401 in FIG. 4C, a position and orientation of the target point of the virtual camera is designated for each timecode as a virtual camera motion. Continuous timecodes (2020-02-02 13:51:11.020 to 2020-02-02 13:51:51.059), such as the timecodes from the first line to the last line in FIG. 4C, are called a timecode period. Also, the start time (13.51.11.020) is called a start timecode and the end time (13:51:51.059) is called an end timecode.

A coordinate of the target point is designated by (x, y, z), and z is a constant value (z=z01) and only (x, y) change. When the continuous value of these coordinates is illustrated in the three-dimensional space 411 illustrated in FIG. 4D, it becomes a locus 412 that translates at a constant height from the field surface (identifier=2 in FIG. 4B). Meanwhile, in relation to the orientation of the virtual camera, only an initial value is designated in the corresponding timecode period. By this, for the automated operation using the automated operation information 401, the orientation does not change from the initial value (−Y direction) in the designated timecode period, and the virtual camera moves so that the target point follows the locus 412 (421 to 423).

For example, if the locus 412 is set so as to follow (target point position=ball position) a position of a ball in a field sport such as rugby, without the virtual camera changing the orientation by the automated operation, the ball and the subject of the periphery are always tracked.

Examples of virtual viewpoint images when the virtual cameras are positioned at reference numerals 421 to 423 are illustrated in FIG. 4E to FIG. 4G, respectively in a case where the automated operation information illustrated in FIG. 4D is used. As illustrated in this series of figures, by changing the timecode and the position, subjects entering the angle of view of the virtual camera change, but all the virtual viewpoint images have the same orientation vector, in other words, have the same −Y direction. In the present embodiment, an automated operation using such automated operation information 401 is also called an automated reproduction.

Note, for coordinates of continuous values such as the locus 412, the coordinates of the ball or the player are foreground objects calculated at the time of generating a three-dimensional model, as described in the model generation unit 205 of FIG. 2A, can be used.

Also, data obtained from a device other than the image display apparatus 104 may be used for the automated operation information. For example, a position measurement tag may be attached to clothing or the like of a player or to a ball which are included as subjects, and the position information may be used as the target point. Also, the coordinates of the foreground objects calculated at the time of generating a three-dimensional model and the position information obtained by the position measurement tag may be used for the automated operation information as is, and information separately calculated from this information may be used. For example, in relation to the coordinate values and measurement values of the foreground objects of the three-dimensional model, the z value is changed depending on the orientation of the player and the position of the ball, but z may be set as the fixed value and only values of x and y used. The value of z may be set to the height of the field (z=0) or a height that is natural and easy on the eyes of the viewer (such as z=1.7 m). Note, the device for obtaining the automated operation information is not limited to the position measurement tag, for example, and information received from another image display apparatus which is different from the image display apparatus 104 being displayed may be used. For example, a worker who operates the automated operation information may input the automated operation information by operating another image display apparatus which is different from the image display apparatus 104.

Note, the timecode period which can be designated to the automated operation information may be the entire game in the field sport or may be a portion thereof.

Note, examples of automated operation information are not limited to the example described above. The items of the automated operation information are not limited if the information is related to the virtual camera motion. Other examples of automated operation information will be described later.

(Manual Operation Screen)

Using FIG. 5A and FIG. 5B, the manual operation of the virtual camera according to the present embodiment will be described. The virtual camera motion designated by the manual operation was determined by the motion setting processing illustrated in FIG. 4A and FIG. 4B. Here, the manual operation method with respect to the virtual camera motion assigned in the motion setting processing and the manual operation method of the timecode will be described.

FIG. 5A is a view for describing the configuration of a manual operation screen 501 of the operation input unit 214 of the image display apparatus 104.

In FIG. 5A, the manual operation screen 501 is mainly configured by a virtual camera operation region 502 and a timecode operation region 503. The virtual camera operation region 502 is the graphical user interface (GUI) for accepting a manual operation of user with respect to the virtual camera and the timecode operation region 503 is the graphical user interface (GUI) for accepting a manual operation of user with respect to the timecode.

First, the virtual camera operation region 502 will be described. The virtual camera operation region 502 executes the virtual camera motion set in the motion setting processing of FIG. 4A and FIG. 4B in accordance with the type of accepted operation.

In the example of FIG. 5A, the type of operation is the type of the touch operation such as a tap and a swipe because a touch panel is used. Meanwhile, if a mouse is used for the input of the user operation, a click operation instead of a tap operation and a drag operation instead of a swipe operation may be performed. The motion such as the translation of the target point and the horizontal/vertical rotation centered around the target point which is the virtual camera motion illustrated in FIG. 4A is assigned to each of these touch operations. A table which determines assignment is called a manual operation setting and is illustrated in FIG. 5B.

Using FIG. 5B, the manual operation setting will be described. In FIG. 5B, there are the touch operation, the number of touches, a touch region and the identifier (ID) of the virtual camera motion in the items.

In the item of the touch operation, the possible touch operations in the virtual camera operation region 502 are enumerated. For example, the tap and the swipe and the like are included. In the item of the number of touches, the number of fingers needed for the touch operation is defined. In the item of the touch region, the region which is to be subject to processing of the touch operation is designated. For example, a virtual camera operation region (the entirety) and a virtual camera operation region (the right edge) and the like are designated. In accordance with the contents of the three items of the touch operation, the number of touches and the touch region, the content of the manual operation accepted from the user are distinguished. Then, when each manual operation is accepted, one of the virtual camera motions is executed according to the assignment of the identifier (ID) of the virtual camera motions to the respective manual operation. The identifier (ID) of the virtual camera motion identifies the type of the virtual camera motion described in FIG. 3C to FIG. 3H as described with reference to FIG. 4A.

In assignment example of FIG. 5B, for example by the designation of second line (No. 2), a horizontal rotation (motion identifier=3) centered around the target point is executed when a horizontal swipe operation with one finger with respect to the virtual camera operation region 502 is accepted. Also, by the designation of the third line (No. 3), a vertical rotation (motion identifier=4) centered around the target point is executed when the vertical swipe operation with one finger with respect to the virtual camera operation region 502 is accepted.

Note, regarding the type of the touch operation used for the manual operation of the virtual camera, a gesture operation in accordance with the number of fingers may be used and a relatively simple gesture operation illustrated in the third embodiment described below may be used. Both can be designated by the manual operation setting of FIG. 5B. Note, operations which can be designated by the manual operation setting are not limited to the touch operation, and operation in the case of using a device other than the touch panel can be designated.

Next, the timecode operation region 503 will be described. The timecode operation region 503 is configured from the components 512 to 515 which are for operating the timecode. A main slider 512 can operate all timecodes of captured data. The arbitrary timecodes in the main slider 512 can be designated by selecting the position of a knob 522 with a drag operation or the like.

A sub slider 513 magnifies and displays some of the timecodes and can operate the timecode with a finer granularity than the main slider 512. The timecode can be designated by selecting the position of a knob 523 with a drag operation or the like. The main slider 512 and the sub slider 513 are the same length on the screen, but the timecode range which can be selected is different. For example, while the main slider 512 can select from among 3 hours which is the length of one game, and the sub slider 513 can select among 30 seconds which is a portion thereof. In other words, the scale of each slider is different, and the sub slider 513 can designate the timecode with finer granularity such as in units of frames. In an example, the sub slider 513 is from 15 seconds before to 15 seconds after of the time at which the knob 522 is positioned.

Note, the timecode designated using the knob 522 of the main slider 512 and the timecode designated using the knob 523 of the sub slider 513 may be displayed as a numerical value in a form of "day:time:minute:second.frame number". Note, the sub slider 513 nee not always be displayed. For example, it may be displayed after accepting a display instruction, and may be displayed when a specific operation such as a pause is instructed. Also, the timecode period which can be selected with the sub slider 513 is variable. When a specific operation such as a pause is accepted, a section from 15 seconds before to 15 seconds after the time of the knob 523 may be displayed at the time of accepting a pause instruction.

A slider 514 which designates a playback speed can designate the playback speed such as normal speed playback and slow playback. An incrementing interval of the timecode is controlled in accordance with the playback speed selected with a knob 524. An example of controlling an incrementing interval of the timecode is described with reference to the flowchart of FIG. 6.

A cancel button 515 may be used in order to cancel each operation relating to a timecode and may also be used to clear a pause and return to normal reproduction. Note that this button is not limited to cancelling if it is a button that performs a manual operation relating to a timecode.

Note, the manual operation screen may include a region other than the virtual camera operation region 502 and the timecode operation region 503. For example, game information may be displayed in a region 511 of the upper part of the screen. A hosting place/date and time, match card, and score situation are given as game information. Note, the game information is not limited to this.

Also, an exceptional operation may be assigned in the region 511 of the upper part of the screen. For example, in a case where the region 511 of the upper part of the screen accepts a double tap, the position and orientation of the virtual camera may be operated to be moved to a position where the entire subject can be viewed from above. There is a case in which a manual operation of the virtual camera is difficult for an inexperienced user and there is also a case in which it is unclear what position they are located in. In such a case, an operation may be assigned so as to return to an overlooking point where the position and orientation are easy for the user to understand. The overlooking image is a virtual viewpoint image which overlooks the subject as shown in FIG. 3B from the Z-axis.

Note, configuration is not limited to these as long as the virtual camera or timecode can be operated and the virtual camera operation region 502 and the timecode operation region 503 need not be separated. For example, a pause or the like may be processed as an operation for the timecode by a double tap or the like on the virtual camera operation region 502. Note, although a case in which the operation input unit 214 is a tablet 500 was described, an operation and display device is not limited to this. For example, the operation input unit 214 may be set such that in a case where the right half of the display region 502 is double tapped, a 10 second fast forward is performed, and in a case where the left half is double tapped, a 10 second rewind is performed.

(Operation Control Processing)

Figure 6:
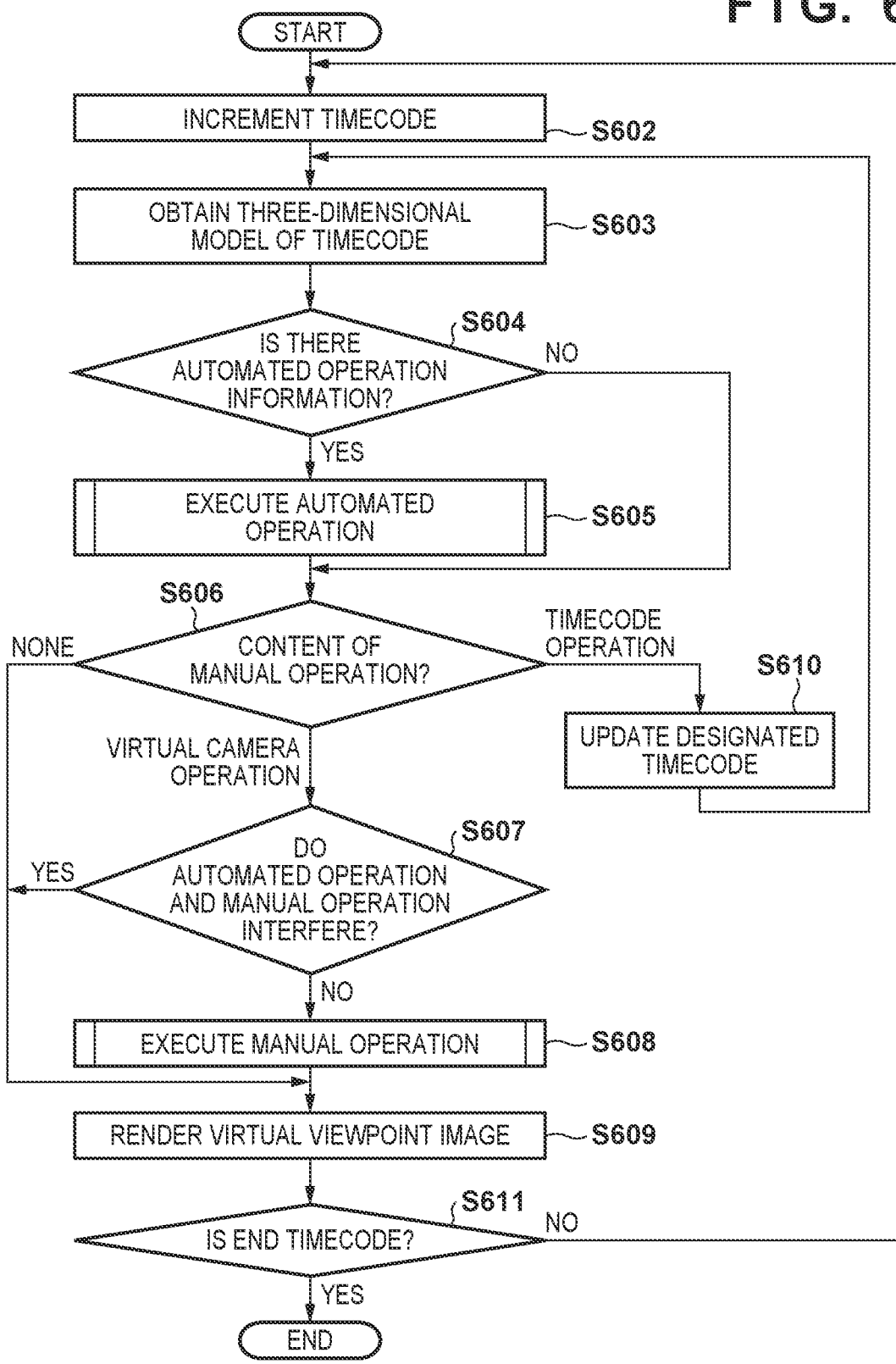
FIG. 6 is a flowchart illustrating a processing example for operation of the virtual camera.

Next, description regarding a process for controlling the virtual camera in which an automated operation and a manual operation according to the present embodiment are significantly combined is given by using the flowchart of FIG. 6.

A virtual camera motion set for each of automated operation and manual operation is determined by the previously described motion setting processing. Furthermore, an automated operation is executed in accordance with the automated operation information described in FIG. 4A and a manual operation is executed in accordance with the manual setting contents described in FIG. 5B. Also, description regarding the virtual camera control processing in which both of these operations are significantly combined is given by the present flowchart. Note, the flowchart illustrated in FIG. 6 is realized by the CPU 211 using the RAM 212 as a work space and executing a program stored in the ROM 213.

The operation control unit 203 executes processing relating to a timecode and a playback speed in step S602, and after this, executes processing for significantly combining an automated operation and a manual operation in steps S604 to S608. Also, the operation control unit 203 executes the loop processing of steps S602 to S611 for each frame. For example, if the frame rate of the outputted virtual viewpoint image is 60 FPS, processing for one loop (one frame) of steps S602 to S611 is performed in an interval of approximately 16.6 [ms]. Note, in relation to the interval of one loop, the processing may be realized by setting an update rate (refresh rate) in the image display of the touch panel or the like to 60 FPS and performing synchronous processing with this in the image display apparatus.

In step S602, the operation control unit 203 increments the timecode. According to the present embodiment, the timecode can be designated by "day:time:minute:second:frame number" as described in FIG. 4C and incrementing is executed for each frame. In other words, since the loop processing of steps S602 to S611 is executed for each frame as previously described, the frame number in the timecode is incremented every one loop process.

Note, the incrementing of the timecode may change the incrementing interval in accordance with a selected value of the playback speed slider 514 described in FIG. 5A. For example, in a case where a playback speed of ½ is designated, frame may be incremented once for every two times the loop processing of steps S602 to S611 is performed.

Next, the operation control unit 203 advances the processing to step S603 and obtains a three-dimensional model of the incremented or designated timecode via the model generation unit 205. The model generation unit 205 generates a three-dimensional model of a subject from the multi-viewpoint image as described in FIG. 2A.

Next, in step S604, the operation control unit 203 determines whether or not there is automated operation information of the automated operation unit 202 in the incremented or designated timecode. In a case where there is automated operation information for the timecode (Yes in step S604), the operation control unit 203 advances the processing to step S605, and in a case where there is no automated operation information (No in step S604), the operation control unit 203 advances the processing to step S606.

In step S605, the operation control unit 203 performs automated operation of the virtual camera by using the automated operation information in the corresponding timecode. Since description regarding an automated operation of the virtual camera is given with reference to FIG. 4A to FIG. 4C, description thereof is omitted.

In step S606, the operation control unit 203 accepts a manual operation from the user and switches the processing in accordance with the accepted operation contents. In a case where a manual operation for a timecode is accepted ("timecode operation" in step S606), the operation control unit 203 advances the processing to step S609. In a case where a manual operation for a virtual camera is accepted ("virtual camera operation" in step S606), the operation control unit 203 advances the processing to step S607. In a case where a manual operation is not accepted ("None" in step S606), the operation control unit 203 advances the processing to step S609.

In step S607, the operation control unit 203 determines whether or not the virtual camera motion designated by a manual operation (step S606) interferes with the virtual camera motion designated by an automated operation (step S605). For a comparison of motions, by using a virtual camera motion identifier illustrated in FIG. 4A, it may be determined whether an automated operation and a manual operation interfere in a case where an automated operation and a manual operation have the same identifier. Note, this is not limited to a comparison of identifiers, and whether or not there is interference may be determined by comparing amount of a change of a position or orientation of the virtual camera or the like.

In a case where it is determined that the motion of the virtual camera designated by a manual operation interferes with the motion designated by an automated operation (Yes in step S607), the operation control unit 203 advances the processing to step S609 and the accepted manual operation is cancelled. In other words, in a case where an automated operation and a manual operation interfere, the automated operation is prioritized. Note, a parameter which does not change by an automated operation is operated based on a manual operation. For example, in a case where a translation of a target point is performed by an automated operation, the position of the target point changes but the orientation of the virtual camera does not change. For this reason, since a horizontal rotation, vertical rotation, or the like of the virtual camera, which do not change the position of the target point but do change the orientation of the virtual camera do not interfere with the translation of the target point, they can be executed by a manual operation. In a case where it is determined that the motion of the designated virtual camera does not interfere with the motion designated by an automated operation (No in step S607), the operation control unit 203 advances the processing to step S608 and executes process for controlling the virtual camera in which an automated operation and a manual operation are combined.

For example, in a case where it is determined that the automated operation motion designated in step S605 is a translation of the target point (identifier=2) and the manual operation motion designated in step S606 is a translation of the target point (identifier=2) to be viewed, the translation of the target point of the manual operation is cancelled. On the other hand, for example, when the automated operation motion designated in step S605 is a translation of target point (identifier=2) and the manual operation motion designated in step S606 is a vertical/horizontal rotation around the center of the target point (identifier=3, 4), they are determined to be different motions. In this case, a motion in which each are combined is executed in in step S608 as described later with reference to FIG. 7A to FIG. 7E.

Continuing, in step S608, the operation control unit 203 executes a manual operation of the virtual camera. Since description regarding the manual operation of the virtual camera was given in FIG. 5A and FIG. 5B, description thereof is omitted. Next, the operation control unit 203 advances the processing to step S609 and generates and renders a virtual viewpoint image in a case where image capturing is performed with the position and orientation of the virtual camera operated by at least one of the automated operation and the manual operation. Since description regarding rendering of a virtual viewpoint image is given in FIG. 2A, description thereof is omitted.

In step S610, the operation control unit 203 updates a timecode to be displayed to a timecode designated by a manual operation by the user. Since description regarding the manual operation for designating a timecode is given in FIG. 5A and FIG. 5B, description thereof is omitted.

In step S611, the operation control unit 203 determines whether or not display of every frame has completed, in other words, whether or not an end timecode has been reached. In a case where an end timecode has been reached (Yes in step S611), the operation control unit 203 ends the processing illustrated in FIG. 6, and in a case where an end timecode has not been reached (No in step S611), the operation control unit 203 returns the processing to step S602. An example of a control of the virtual camera for which the above flowchart was used and an example of a generation of the virtual viewpoint image are described by using the following FIG. 7A to FIG. 7E.

(Example of Virtual Camera Control and Example of a Display of a Virtual Viewpoint Image)

Description regarding an example of control of a virtual camera in which an automated operation and a manual operation are combined and an example of a display of a virtual viewpoint image according to the present embodiment is given with reference to FIG. 7A to FIG. 7E.

Here, a case in which the automated operation information described in FIG. 4C and FIG. 4D is used for an automated operation and a case in which the manual setting contents described in FIG. 5B are used for a manual operation are described as an example of a control of the virtual camera.

For the automated operation of FIG. 4C and FIG. 4D, the virtual camera is operated so as to translate (identifier=2) so that the coordinates of the target point of the virtual camera follow the locus 412 according to the passage of the timecode without changing the orientation. For the manual operation of FIG. 5B, the virtual camera is operated by the user so that a horizontal/vertical rotation (FIG. 3G and FIG. 3H, identifier=3, 4) or the like around the center of a target point is performed by an operation of at least one of a swipe and drag.

For example, if the locus 412 of FIG. 4D follows a ball in a field sport, the automated operation of step S605 is a motion which translates so as to always capture the ball at the target point of the virtual camera. In addition to this motion, by performing a manual operation of horizontal/vertical rotation around the center of the target point, the user can always follow the ball without being aware of it while viewing players in its periphery from various angles.

Description is given regarding an example of this series of motions by using FIG. 7A to FIG. 7D. In the example of FIG. 7A to FIG. 7E, it is assumed that the sport is rugby and a scene in which players will perform an offload pass (a pass just before falling down) is captured. In such a case, the subject is a rugby ball and at least one player on the field.

Figure 7A:
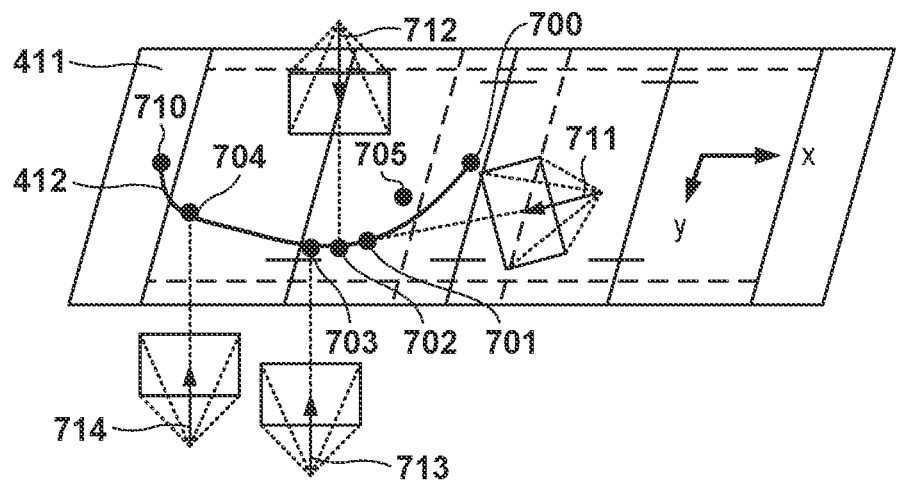
FIG. 7A is a view illustrating an operation example.

FIG. 7A is a view in which the three-dimensional space of the field is overlooked and is a case in which the target point of the virtual camera translates (identifier=2) to coordinates 701 to 703 by an automated operation (the locus 412).

Figure 7B:
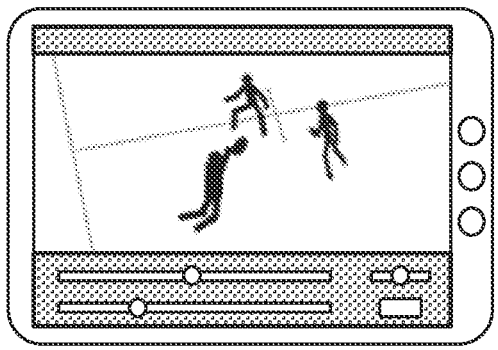
FIG. 7B is a view illustrating a display example.

First, a case in which the target point of the virtual camera is at the coordinate 701 is described. The position of the virtual camera at this time is at the coordinate 711 and the orientation is mostly in the −X direction. As illustrated in FIG. 7B, the virtual viewpoint image at this time is a view of the play in the −X direction along the long side direction of the field.

Figure 7C:
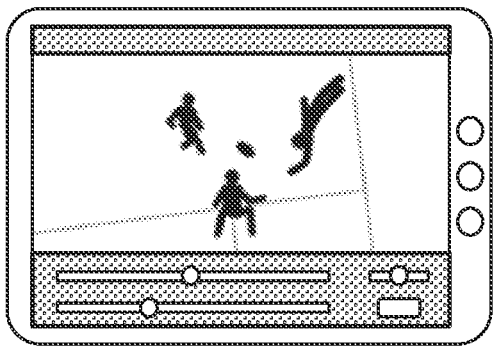
FIG. 7C is a view illustrating a display example.

Next, a case where the target point of the virtual camera translates by an automated operation to the coordinate 702 is described. Here, it is assumed that, while the target point translates (identifier=2) by an automated operation from the coordinate 701 to 702, a manual operation of a vertical rotation (identifier=4) around the center of the target point is performed by the user. In such a case, the position of the virtual camera translates to a coordinate 712 and the orientation of the virtual camera vertically rotates mostly in the −Z direction. As illustrated in FIG. 7C, the virtual viewpoint image at this time is an overlook of subjects from the upper side of the field.

Figure 7D:
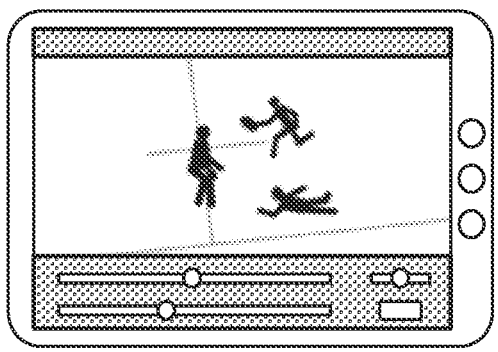
FIG. 7D is a view illustrating a display example.

Furthermore, a case where the target point of the virtual camera translates to the coordinate 703 is described. Here, it is assumed that, while the target point translates (identifier=2) from the coordinate 702 to 703, a manual operation of a horizontal rotation (identifier=3) around the center of the target point is performed by the user. In such a case, the position of the virtual camera translates to a coordinate 713 and the orientation of the virtual camera vertically rotates in substantially the −Y direction. As illustrated in FIG. 7D, the virtual viewpoint image at this time is a view of subjects from outside of the field in the −Y direction.

As described above, by significantly combining an automated operation and a manual operation, in a fast-developing scene such as a rugby offload pass, it is possible to continuously, automatically capture the vicinity of the ball within the angle of view of the virtual camera and view the scene from various angles according to manual operation. Specifically, by an automated operation, it is possible to always continuously capture the vicinity of the ball within the angle of view of the virtual camera by using coordinates of the ball obtained from a three-dimensional model or a position measurement tag without imposing an operational burden on the user. Furthermore, as a manual operation, the user can view a play to be targeted from various angles by simply applying a simple drag operation (horizontal/vertical rotation in which the target point is made to be the gaze point by dragging one finger).

Figure 7E:
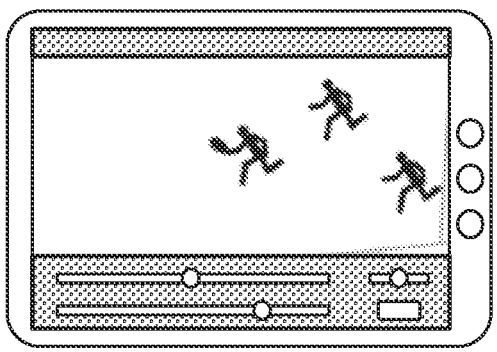
FIG. 7E is a view illustrating a display example.

Note, in a section (the locus 412) in which an automated operation is performed, in a case where a manual operation is not performed, the orientation of the virtual camera is kept at the orientation by the last the manual operation. For example, in a case where a manual operation is not performed while a position of the target point translates (identifier=2) from the coordinate 703 to 704 by an automated operation, the orientation of the virtual camera remains the same at the coordinate 713 and the coordinate 714 (the same orientation vector). Accordingly, as illustrated in FIG. 7E, the orientation of the virtual camera is in the −Y direction, and in FIG. 7D hereinafter, while time passes while there is no manual operation, and the image display apparatus 104 displays in the same orientation a scene in which the players succeed in performing an offload pass and the players sprint toward a try.

Note, processing for temporarily invalidating or enabling the contents set by at least one of a manual operation and an automated operation may be added in the operation control of FIG. 6 and FIG. 7A to FIG. 7E. For example, in a case where a pause instruction for reproduction of the virtual viewpoint image is accepted, the motion setting processing set by a manual operation and an automated operation may be reset to set a default virtual camera position and coordinates. Regarding the position of the default virtual camera, with respect to an orientation above the field from which the entire field fits into the angle of view, for example, the position and coordinates of the virtual camera may be changed in the −Z direction.

In another example, in a case where an instruction to pause reproduction of the virtual viewpoint image is accepted, contents set by a manual operation may be invalidated, and in a case where the pause is released and reproduction is resumed, contents set by the manual operation may be reflected once again.

Also, in a case where, at a time of an automated operation, translation (identifier=2) of the target point is set to an automated operation, a manual operation is cancelled in step S607 as the result of the manual operation being for the same motion (identifier=2), when paused, a manual operation for the translation of the target point may be possible irrespective of the automated operation information.

For example, a case in which a pause is accepted when the target point of the virtual camera is at the coordinate 701 in an automated reproduction is considered. The virtual viewpoint image at this time was shown in FIG. 7B; however, the appearance of a tackling player of an opponent team who triggered the offload pass is desired to be confirmed, but the outside player is out of the angle of view. In such a case, the user can perform a pause and translate the target point to a coordinate 705 or the like in a case where a manual operation of a translation in the downward direction of the screen is performed.

Also, in a case where a pause is released and normal reproduction is returned to may be set such that the motion setting contents become enabled, the translation (identifier=2) of the target point by an automated operation is executed, and the translation (identifier=2) of the target point by a manual operation is cancelled. Note that at this time, the movement amount (movement distance from the coordinate 701 to the coordinate 705) that has been translated by the manual operation may also be canceled, and processing for returning the target point to the coordinate 701 designated by the automated operation may be performed.

As described above, by significantly combining an automated operation and a manual operation and controlling the virtual camera, it becomes possible to continuously capture a desired place of a subject within an angle of view of the virtual camera and browse from various angles even if for a scene in which a subject makes a fast, complex movement.

For example, in a field sport such as rugby, it is possible to continuously capture the vicinity of a ball within the angle of view of the virtual camera by an automated operation and view the scene from various angles if a manual operation is applied even for scenes in which a play develops suddenly over a wide range of the field and leads to a score.

Second Embodiment

In the present embodiment, tag generation processing and tag reproduction processing in the image display apparatus 104 is described. The same configurations, processes, and functions use the same reference numerals as in the first embodiment, including the virtual viewpoint image generation system of FIG. 1A and the image display apparatus 104 of FIG. 2A, and the description thereof is omitted.

A tag of the present embodiment is something that makes it possible for the user to select a target scene such as when a point is scored in sports and to set an automated operation in the selected scene. The user can also perform additional manual operations during automatic reproduction according to a tag and can execute virtual camera control processing in which an automated operation and a manual operation are combined by using the tag.

Such a tag is used for commentary on sports programs and the like, which is a typical use case for virtual viewpoint images. In such a use case, there is a need to be able to browse, from various positions and angles, and commentate on a plurality of important scenes such as when a point is scored. In addition to performing automated operation of the position of the ball or player illustrated in the example of the first embodiment as a target point of the virtual camera, in this embodiment, it is also possible to generate a tag for which an arbitrary position other than an object such as a ball or a player is made to be the target point, in accordance with an intention of the commentary or the like.

In the present embodiment, a tag is described assuming that the automated operation for setting the position and orientation of the virtual camera is associated with a timecode. However, in one example, configuration may be taken such that a timecode period (time period), in which a start and end timecode are included, and a plurality of automated operations within the timecode period are associated.

Note, in the virtual viewpoint image generation system of FIG. 1A, configuration may be taken such that, in a configuration in which data of a time period to be targeted such as a score is copied from the database 103 to the image display apparatus 104 and used, a tag is added to the copied timecode period. As a result, it is easy to access only the copied data, and the image display apparatus 104 can be used for commentary using a virtual viewpoint image of an important scene in a sports program or the like.

A tag in the present embodiment is managed in the tag management unit 204 in the image display apparatus 104 (FIG. 2A) and tag generation and tag reproduction processing is executed in the operation control unit 203. Each process is realized based on the automated operation of FIG. 4A and the manual operation of FIG. 5B described in the first embodiment, and virtual camera control processing and the like in which an automated operation and a manual operation are combined FIG. 6.

(Tag Generation Processing)

Next, a method for generating a tag in the image display apparatus 104 is described with reference to FIG. 8A.

Figure 8A:
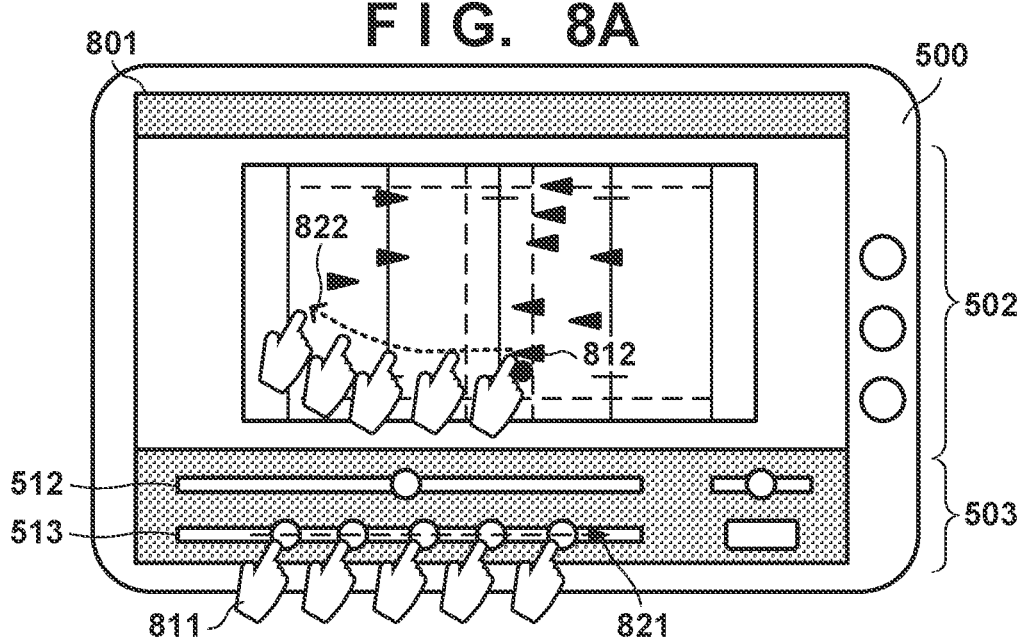
FIG. 8A is a view illustrating tag generation according to a second embodiment.

FIG. 8A is the same configuration as the manual operation screen of the image display apparatus 104 described in FIG. 5A and the touch panel 501 is largely divided into the virtual camera operation region 502 and the timecode operation region 503.

In the user operation for tag generation, firstly, the user selects a timecode in the timecode operation region 503 and then designates a virtual camera motion for the timecode in the virtual camera operation region 502. By repeating these two steps, it is possible to create an automated operation in an arbitrary timecode period.

Even at a time of a tag generation, an operation for designating a timecode in the timecode operation region 503 is the same as the contents described in FIG. 5A. In other words, by performing a drag operation of a knob on the main slider, or by performing a drag operation 811 of a knob on the sub slider, it is possible to designate a timecode at which tag generation is desired.

Note, in relation to the designation of the timecode, it may be possible to designate a rough timecode in the main slider 512, perform a pause instruction, and then designate a detailed timecode by using the sub slider 513 in which a range of several tens of seconds before and after that time is displayed. Note, the sub slider 513 may be displayed when tag generation is instructed.

When a user selects a timecode, a virtual viewpoint image (an overlooking image) at this timecode is displayed. On the virtual camera operation region 502 in FIG. 8A, a virtual viewpoint image overlooking a subject is displayed. This is because it is easier to discern the play situation while watching an overlooking image that displays a wide ranging subject and designation of a target point can be easily performed.

Next, while viewing the overlooking image (a virtual viewpoint image) for the timecode being displayed, a target point of the virtual camera for the timecode is designated by a tap operation 812. The image display apparatus 104 converts a tapped position to coordinates on a target surface of the virtual camera in three-dimensional space, and records the coordinates as the coordinates of the target point at the timecode. Note that, in the present embodiment, XY coordinates are assumed to be a tapped position, and a Z coordinate will be described as Z=1.7 m. However, Z-coordinate may be obtained based on a tapped position similar to the XY coordinates. A method for converting from a tap position into coordinates is publicly known, and so description is omitted.

By repeating the above two steps (821 and 822 in FIG. 8A), a target point of the virtual camera can be designated in a temporal sequence in an arbitrary timecode period.

Note that, although timecodes designated by the above operation are sometimes not continuous and there are intervals therebetween, coordinates may be generated by interpolation using manually designated coordinates during the intervals. A method of interpolating between a plurality of points using a respective curve function (a spline curve or the like) is publicly known, and so is omitted.

A tag generated in the above procedure is of the same form as the automated operation information illustrated in FIG. 4A. Thus, a tag generated in the present embodiment can be used for a virtual camera control process described in the first embodiment where an automated operation and a manual operation are significantly combined.

Note that, the virtual camera motion to be designated by a tag is not limited to coordinates of a target point, and may be any of the virtual camera motions described in the first embodiment.

Using the above method, it is possible to generate a plurality of different tags with respect to a plurality of scoring scenes in one game. Also, it is possible to generate a plurality of tags which have different automated operation information with respect to a timecode in the same section.

Note that, configuration may be taken so that a button for switching between a normal virtual camera operation screen described in the first embodiment and a tag generation operation screen in the present embodiment may be prepared. Note that, while not illustrated, configuration may be taken so that, after switching to a tag generation operation screen, a process to move the virtual camera to a position and an orientation overlooking a subject is performed.

Using the above described tag generation process, it is possible to easily generate an automated operation as a tag at an arbitrary timecode period when a target scene such as when a point is scored occurred in a sports game. Next, a tag reproduction process by which a user can easily automatically reproduce a scene by selecting a tag generated in this manner will be described.

(Tag Reproduction Process)

Next, using a flowchart in FIG. 9 and operation screens of FIG. 8B and FIG. 8C, a tag reproduction in the image display apparatus 104 will be described.

Figure 9:
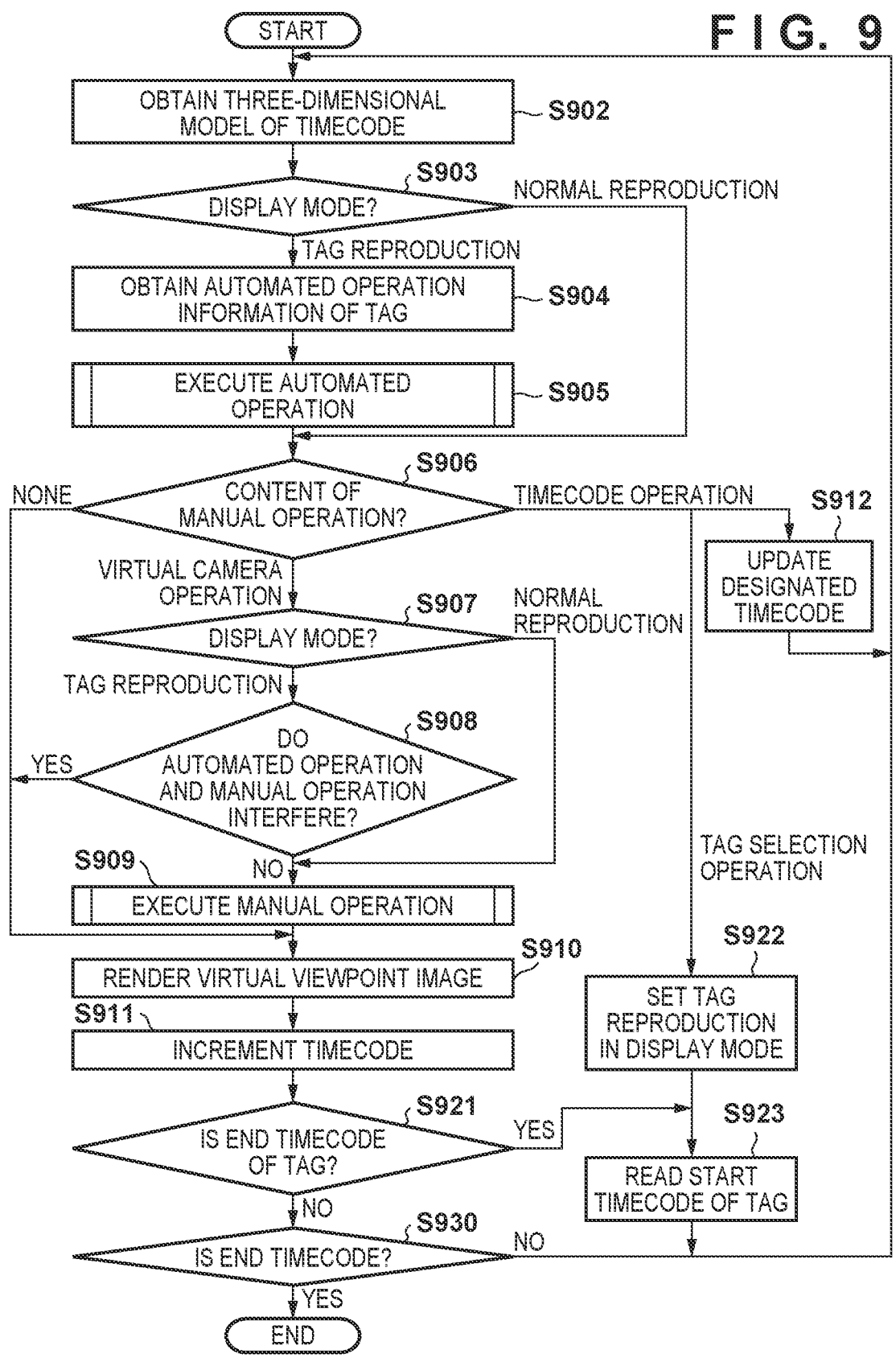
FIG. 9 is a flowchart illustrating a processing example for operation of the virtual camera according to the second embodiment.

FIG. 9 is a flowchart for illustrating an example of a control process of the virtual camera which the image display apparatus 104 during a tag reproduction executes. In FIG. 9, similarly to FIG. 6, the operation control unit 203 repeatedly executes processes of S902 to S930 for each frame. Each time, the frame number in the timecode is incremented by one, and continuous frames are processed. Note that, description of steps which are the same processing as in the flowchart of a virtual camera control process in FIG. 6 is omitted.

In step S902, the operation control unit 203 performs the same processing as in S603 and obtains a three-dimensional model of a current timecode.

In step S903, the operation control unit 203 determines a display mode. The display mode is a display mode for the operation screen of FIG. 5A, and a normal reproduction mode and a tag reproduction mode are determined. When a determination result of the display mode is a normal reproduction, the processing proceeds to step S906, and when it is a tag reproduction, the processing proceeds to step S904.

Note that the display modes to be determined are not limited to these. For example, tag generation illustrated in FIG. 8A may be added to a target of mode determination.

Next, the image display apparatus 104 advances the processing to step S904, and the operation control unit 203, since the display mode is tag reproduction, reads the automated operation information designated by the timecode in a selected tag. The automated operation information is illustrated in FIG. 4C or the like as was described previously. Next, the image display apparatus 104 advances the processing to step S905, and the operation control unit 203 performs the same processing as in step S605 and automatically operates the virtual camera.

Next, the image display apparatus 104 advances the processing to step S906, and the operation control unit 203 accepts a manual operation from a user and switches the processing in accordance with the accepted operation content. In a case where a manual operation with respect to a timecode is accepted from the user ("timecode operation" in step S906), the image display apparatus 104 advances the processing to step S912. In a case where a manual operation relating to a virtual camera is accepted from a user (in step S906, "virtual camera operation"), the image display apparatus 104 advances the processing to step S922. In a case where a manual operation is not accepted from a user ("none" in step S906), the image display apparatus 104 advances the processing to step S907. In a case where a tag selection operation is accepted from a user ("tag selection operation" in step S906), the image display apparatus 104 advances the processing to step S922. A manual operation screen at this time will be described using FIG. 8B and FIG. 8C.

Note that the manual operation content determined in step S906 is not limited to these, and a tag generation operation illustrated in FIG. 8A may be targeted.

Figure 8B:
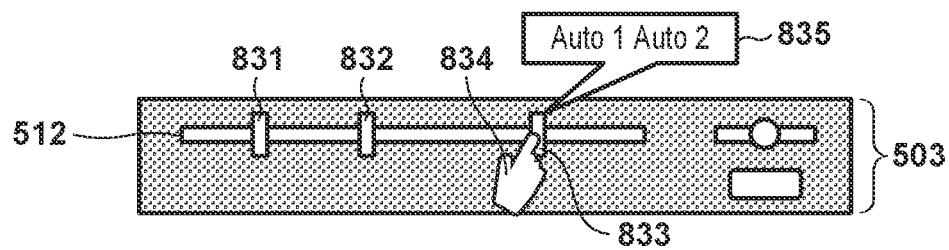
FIG. 8B is a view illustrating a tag reproduction method according to the second embodiment.

In FIG. 8B, the timecode operation region 503 in a manual operation screen 801 is extracted. On the main slider 512 which operates the timecode of FIG. 8B, a plurality of tags (831 to 833) are displayed in a distinguishable manner. As to the display positions of tags (831 to 833), the start timecode of a tag is displayed at a corresponding position on a main slider. Note that, for the tags that are displayed, a tag generated in an image generation apparatus 104 illustrated in FIG. 8A may be used, and a tag generated on another device may be read in.

Here, a user selects any of a plurality of tags (831 to 833) displayed on the main slider 512 by a tap operation 834. When a tag is selected, as illustrated in a speech bubble 835, automated operation information set in a tag can be listed. In the speech bubble 835, two automated operations are set in the timecode, and the two tag names (Auto1 and Auto2) corresponding to them are displayed. Note that, the number of tags which can be set as the same timecode is not limited to two. When a user selects any tag of tags 831 to 833 by the tap operation 834, the image display apparatus 104 advances the processing to step S922.

In step S922, the operation control unit 203 sets tag reproduction as the display mode, and advances the processing to step S923.

In step S923, the operation control unit 203 reads a start timecode designated by a tag selected in step S906, and advances the processing to step 912. Then, in step S912, the operation control unit 203 updates the timecode to a designated timecode, and returns the processing to step S902. Moreover, in after S904 and S905, the image display apparatus 104 performs an automated operation of the virtual camera using automated operation information designated by the selected tag.

Figure 8C:
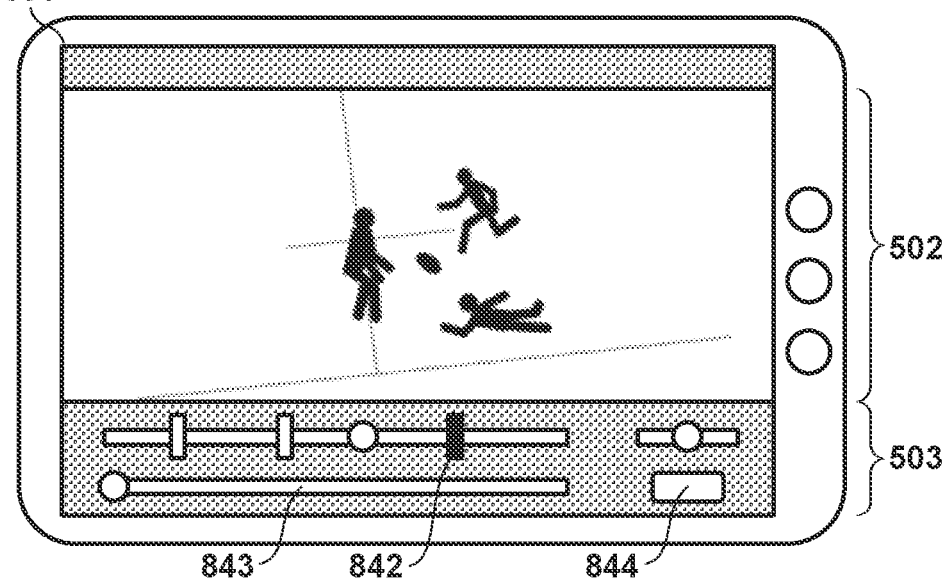
FIG. 8C is a view illustrating a tag reproduction method according to the second embodiment.

Here, a screen at a time of tag reproduction (automated reproduction after tag selection) is illustrated in FIG. 8C. In FIG. 8C, a sub slider 843 is displayed on the timecode operation region 503. Note that, the scale of the sub slider 843 may be a length of a timecode period designated by a tag. Also, the sub slider 843 may be displayed dynamically when tag reproduction is instructed. Also, at a time of tag reproduction, a tag that is being reproduced may be replaced with a display 842 which can distinguished from other tags.

In the virtual camera operation region 502 of FIG. 8C, a virtual viewpoint image generated by a virtual camera designated by automated operation information included in a selected tag is displayed. At a time of tag reproduction, a manual operation can be additionally accepted, and in S907 and S908, the image display apparatus 104 executes a virtual camera control process where an automated operation and a manual operation are combined similarly to what is described in the first embodiment.

In step S907, when the operation control unit 203 accepts a manual operation relating to a virtual camera, the operation control unit 203 confirms a current display mode. In a case where the display mode is tag reproduction mode ("normal reproduction" in step S907), the operation control unit 203 advances the processing to step S909, and in a case where the display mode is normal reproduction mode ("tag reproduction" in step S907), the operation control unit 203 advances the processing to step S908.

In step S908, the operation control unit 203 compares an automated operation in the selected tag with a manual operation of a virtual camera accepted in step S906, and the determines whether they interfere each other or not. The method for comparing the automated operation and the manual operation is similar to that of step S607, and so description is omitted.

In step S909, the operation control unit 203 performs the manual operation of a virtual camera similarly to in step S608. In step S910, the operation control unit 203 renders a virtual viewpoint image similarly to step S609. In step S91.1, the operation control unit 203 increments the timecode. The incrementing of the timecode is similar to in step S602, and so description is omitted.

In step S921, the operation control unit 203, determines whether the timecode incremented in step S91.1 at the time of tag reproduction is an end timecode designated for the tag or not. In a case where the incremented timecode is not an end timecode designated in the tag (NO in step S921), the operation control unit 203 advances the processing to step S930 and performs a determination similar to in step S611. In a case where the incremented timecode is an end timecode designated in the tag (YES in step S921), the operation control unit returns the processing to step S923, and reads the start timecode of the selected tag, and performs repeat reproduction which repeats tag reproduction. Note that, in this case, a manual operation set in previous reproduction may be reflected as an automated operation.

Note that, a user, in order to deactivate repeat reproduction during tag reproduction, may press a cancel button 844 illustrated in FIG. 8C.

Note that, when tag reproduction is repeated, an orientation of a final manual operation may be maintained at a time of repeating. Configuration may be taken such that in a case of operating the automated operation information in FIG. 4C and FIG. 4D as a tag, in a case where repeat reproduction is performed in a timecode period (the locus 412, a start point 700, and an end point 710), an orientation at the end point 710 is maintain even if the start point 700 is returned to. Alternatively, configuration may be taken to, when returning to the start point 700, return to an initial value of an orientation designated in automated operation information.

As described above, by virtue of the method of generating a tag according to the present embodiment, in the image display apparatus 104, automated operation information with respect to a timecode of the predetermined range can easily be generated in short time.

Also, by virtue of a tag reproduction method, a user can perform automated reproduction for each scene by only a simple operation of selecting a desired one from a plurality of tags. Also, even if subject behavior is different for each scene and is complicated, by the automated operation, a position to be targeted can be continuously captured within an angle of view of a virtual camera in each scene. Also, a user applies a manual operation to an automated operation to be able to display a subject at an angle that the user desires. Also, since a user can add an automated operation as a tag, it is possible to combine a plurality of virtual camera operations according to user preference.

For example, by designating the timecode by a timecode operation with respect to a plurality of scenes where a point is scored in a sports broadcast and adding a designation operation for target point coordinates of the virtual camera as a tag, tags of a plurality of scenes can easily be generated. By using these tags in a post game explanation program or the like, the person explaining can easily display a plurality of score scenes from various angles and use them for their explanation. For example, as illustrated in FIG. 7B to FIG. 7D in the first embodiment, by displaying a scene to be targeted from various angles, it is possible to explain a point to be targeted or the like in detail.

Also, the tags are not limited to sport explanation, and for example, it is possible to generate tags with respect to a scene that an expert in a target sport or a well-known player should focus on, and other users can use such a tag for tag reproduction. By only performing a simple operation, a user can also enjoy watching the scene to be targeted from various angles using tags set by a highly specialized person.

Also, it is possible to transmit a generated tag to another image display apparatus and reproduce the scene automatically by using the tag in another image display apparatus.

Third Embodiment

In the present embodiment, one example of a manual operation of the virtual camera in the image display apparatus 104 will be described. Compared to a method of switching a virtual camera motion in accordance with the number of fingers in a touch operation being changed, a user can more easily perform a manual operation because the motion of the virtual camera can be switched with one finger.

Description of configuration, procession, and functions similar to those of the first and second embodiments are omitted. The virtual viewpoint image generation system of FIG. 1A and the functional blocks of the image display apparatus 104 of FIG. 2A were described in the first embodiment, and so description thereof is omitted, and only manual operation will be additionally described.

Figure 10:
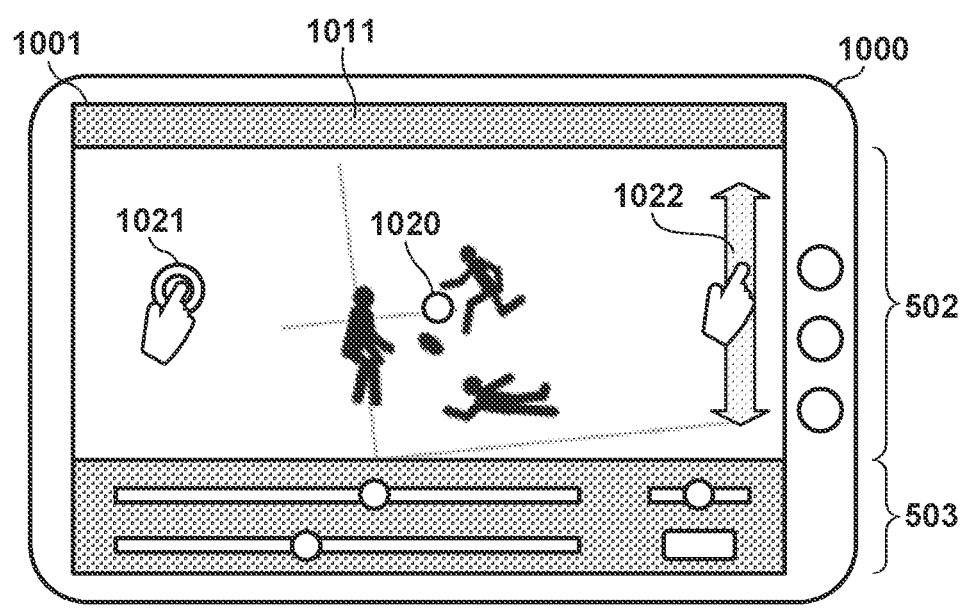
FIG. 10 is a view illustrating a manual operation example according to a third embodiment.

With reference to FIG. 10, a manual operation with respect to the virtual camera in the present embodiment will be described. In a screen configuration of FIG. 10 includes, similarly to FIG. 5A described in the first embodiment, the virtual camera operation region 502 and the timecode operation region 503 displayed on a touch panel 1001. The component of the timecode operation region 503 is similar to what is described with reference to FIG. 5A, and so description is omitted.

In the present embodiment, a touch operation of a virtual camera operation region 1002 with respect to two virtual camera motions when a touch panel is used for the operation input unit 214 of the image display apparatus 104 will be described. One motion is a translation of a target point of the virtual camera illustrated in FIG. 3F, and the other motion is an enlargement/shrinking of the virtual camera (not shown).

In the present embodiment, a touch operation for performing a translation of the target point of the virtual camera is a tap operation 1021 with respect to an arbitrary position of the operation region (or, a double tap operation). The image display apparatus 104 converts the tapped position into coordinates on the target surface of the virtual camera in a three-dimensional space, and translates the virtual camera so that the coordinates becomes the target point of the virtual camera. To the user, the operation moves the tapped position to the center of the screen, and by simply repeating tap operations, it is possible to continue to display the position that the user wishes to target on the subject. Note that, in one example, the virtual camera may be translated from a coordinate 1020 of the target point of the current virtual camera to the point designated by the tap operation 1021 at a predetermined speed. Note that, a movement speed from the coordinate 1020 to the point designated by the tap operation 1021 may be a constant speed movement. In this case, the movement speed may be determined to complete the movement in a predetermined period such as one second. Alternatively, configuration may be taken such that a movement speed increases in proportion to the distance to the point designated by the tap operation 1021 and becomes slower as it becomes close to the point designated by the tap operation 1021.

Note that, with a translation performed by a drag operation (a swipe operation) using two fingers, it was difficult to adjust a movement amount of the drag operation when the subject quickly moved. In contrast to this, in the present embodiment, only an intuitive tap operation on a destination to be moved is needed.

A touch operation for enlarging or shrinking the virtual camera is a drag operation 1022 in a predetermined region of the right edge of the virtual camera operation region 1002. For example, a pinch-out is performed by dragging (swiping) the predetermined region of the end (edge) of the virtual camera operation region 1002 in the upward direction and a pinch-in is performed by dragging (swiping) in the downward direction. Note that, in the example of FIG. 10, the right edge of the screen of the virtual camera operation region 1002 is illustrated, but it may be a screen edge in another direction, and drag directions are not limited to up and down.

Compared to the case of performing enlargement/shrinking by a pinch-out and a pinch-in with two fingers, only a drag operation with one finger on the screen edge is needed. For example, dragging in the upward direction at the screen edge enlarges, and dragging in the downward direction at the screen edge shrinks.

Note that, the operation described above can be set to the manual setting content described in FIG. 5A and FIG. 5B and can be used in a virtual camera control process where an automated operation and a manual operation are combined as described in the first embodiment.

As described above, by the manual operation according to the present embodiment, it is not necessary for a user to switch the number of fingers in order to operate the virtual camera at small increments, and it is possible to operate the image display apparatus 104 intuitively with one finger. Also, in a translation operation, as it is possible to translate to a predetermined position by designating a target point of a movement destination by tapping, compared to an operation which needs adjustment of the operation amount such as a drag and a swipe or the like, it is possible to instruct a translation intuitively.

Fourth Embodiment

In the present embodiment, one example of an automated operation of the virtual camera in the image display apparatus 104 will be described.

As one example of automated operation information, using the same item as FIG. 4C, for a timecode of a particular section, constant values are used for both the coordinates and the orientation of the target point of the virtual camera. For example, a game is sometimes interrupted by an injury of a player or a foul in a sport, and such a time slot may be boring to the viewer. Configuration may be taken to, in a case where such an interruption is detected, automatically operate the virtual camera to a position and an orientation from which the entire field can be seen and execute an automated operation which advances the timecode at a double speed. Also, it is possible to designate that the entirety of interruptions be skipped. In this case, an interruption of a game may be input by a worker and may be designated by a user using a tag. By performing such an automated operation, a user can fast forward or skip a boring time slot when a play is interrupted.

As another example, configuration may be taken to set, in a scene where a play develops very quickly, a playback speed to change with respect to the timecode of a predetermined section. For example, by setting a playback speed to a delayed value such as a half speed, a user can easily perform a manual operation of the virtual camera which was difficult to perform at a full speed.

Note that configuration may be taken to detect, by image analysis for determining that the referee performed a gesture or that movement of the ball or players stopped in the case of sports that a play is being was interrupted in the game. On the other hand, configuration may be taken to detect by an image analysis according to a movement speed of a player or a ball that the play is progressing quickly. Also, configuration may be taken to detect that play is interrupted or that play is progressing quickly by using audio analysis.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-082818, filed on May 8, 2020, which is hereby incorporated by reference herein in its entirety.

What is claimed is:

1. An image display apparatus comprising:
   one or more memories storing instructions; and
   one or more processors executing the instructions to:
      accept a user operation corresponding to determining a first parameter that designates an orientation of view from a virtual camera, the virtual camera corresponding to a virtual viewpoint image generated based on a plurality of images;
      obtain a second parameter that is set in advance and that designates a plurality of positions of a target point corresponding to the virtual camera, each of the plurality of positions of the target point corresponding to one of consecutive frames and being different, the plurality of positions of the target point in each of the consecutive frames being on an optical axis of the virtual camera in each of the consecutive frames; and
      display, on a display, the virtual viewpoint image generated based on the first parameter and the second parameter.

2. The image display apparatus according to claim 1, wherein the first parameter and the second parameter correspond to a combination of the orientation of view from the virtual camera and the target point corresponding to the virtual camera for a predetermined time.

3. The image display apparatus according to claim 1, wherein the user operation is accepted via at least one of a graphical user interface (GUI) displayed on the display and a touch panel.

4. The image display apparatus according to claim 3, wherein, in a case where a drag operation or a swipe operation is accepted at a region of an end of the virtual viewpoint image, the first parameter which corresponds to a zoom in or a zoom out corresponding to a direction of the drag operation or the swipe operation is determined.

5. The image display apparatus according to claim 1, wherein, the display, in a case where the display accepts a pause instruction while displaying the virtual viewpoint image, the virtual viewpoint image generated based on the first parameter and not based on the second parameter is displayed.

6. The image display apparatus according to claim 5, wherein in a case where the display, while displaying the virtual viewpoint image, accepts a pause release instruction after having accepted a pause instruction, the display displays the virtual viewpoint image generated based on the second parameter.

7. The image display apparatus according to claim 5, wherein in a case where the display, while displaying the virtual viewpoint image, accepts a pause release instruction after having accepted a pause instruction, the display displays the virtual viewpoint image corresponding to an orientation of view from virtual camera and target point position in the virtual viewpoint image when the pause instruction was accepted.

8. The image display apparatus according to claim 1, wherein the first parameter includes a designation of a playback speed of the virtual viewpoint image.

9. The image display apparatus according to claim 1, wherein the display further displays a graphical user interface that includes a first slider by which timecodes of the virtual viewpoint image can be designated and a second slider by which a timecode can be designated at a fine granularity by magnifying a portion of the timecodes.

10. The image display apparatus according to claim 9, wherein the second parameter is corresponded to a specific object displayed on a display surface, and the specific object is displayed on a first slider, and the second parameter is obtained by a user operation selecting the specific object.

11. The image display apparatus according to claim 1, wherein the display displays the virtual viewpoint image generated in accordance with an update rate of the display.

12. The image display apparatus according to claim 1 wherein the one or more processors execute the instructions further to receive from an external apparatus at least one of a multi-viewpoint image and data for generating the virtual viewpoint image.

13. The image display apparatus according to claim 1, wherein the second parameter includes a plurality of timecodes corresponding to the positions of target points.

14. The image display apparatus according to claim 1, wherein the second parameter is corresponded to a specific object displayed on a display surface, and obtained by a user operation selecting the specific object.

15. The image display apparatus according to claim 1, wherein the second parameter is set by an input of a user different from a user who performs the user operation corresponding to determining the first parameter.

16. A control method of an image display apparatus comprising:
  accepting a user operation corresponding to determining a first parameter that designates an orientation of view from a virtual camera, the virtual camera corresponding to a virtual viewpoint image generated based on a plurality of images;
  obtaining a second parameter set in advance which designates a plurality of positions of a target point corresponding to the virtual camera, each of the plurality of positions of the target point corresponding to one of consecutive frames and being different, the plurality of positions of the target point in each of the consecutive frames being on an optical axis of the virtual camera in each of the consecutive frames; and
  displaying the virtual viewpoint image generated based on the first parameter and the second parameter.

17. A non-transitory computer-readable storage medium storing a program for causing a computer that has a display to execute a control method of an image display apparatus comprising:
  accepting a user operation corresponding to determining a first parameter that designates an orientation of view from a virtual camera, the virtual camera corresponding to a virtual viewpoint image generated based on a plurality of images;
  obtaining a second parameter set in advance which designates a plurality of positions of a target point corresponding to the virtual camera, each of the plurality of positions of the target point corresponding to one of consecutive frames and being different, the plurality of positions of the target point in each of the consecutive frames being on an optical axis of the virtual camera in each of the consecutive frames; and
  displaying the virtual viewpoint image generated based on at least one of the first parameter and the second parameter.

* * * * *